US006899403B2

(12) United States Patent
Isono et al.

(10) Patent No.: US 6,899,403 B2
(45) Date of Patent: May 31, 2005

(54) BRAKING SYSTEM HAVING PRESSURE CONTROL CYLINDER WHOSE PISTON IS DISPLACEABLE BY CONTROLLED DRIVE SOURCE

(75) Inventors: Hiroshi Isono, Toyota (JP); Yasuji Mizutani, Susono (JP); Takayuki Yamamoto, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 179 days.

(21) Appl. No.: 10/179,834

(22) Filed: Jun. 26, 2002

(65) Prior Publication Data

US 2003/0020327 A1 Jan. 30, 2003

(30) Foreign Application Priority Data

Jul. 24, 2001 (JP) ....................................... 2001-222960

(51) Int. Cl.[7] ............................ B60T 13/18; B60T 8/44
(52) U.S. Cl. ....................................... 303/11; 303/114.1
(58) Field of Search ........................ 303/11, 15, 122.11, 303/113.4, 113.3, 114.1, 114.2, 115.4, 116.1, 116.2

(56) References Cited

U.S. PATENT DOCUMENTS 4,755,008 A 7/1988 Imoto et al.
6,135,575 A * 10/2000 Feigel et al. ............. 303/113.4
6,467,266 B1 10/2002 Kanazawa et al.
6,604,795 B2 * 8/2003 Isono et al. ................... 303/11

FOREIGN PATENT DOCUMENTS

| | | |
|---|---|---|
| DE | 3424912 A1 | 1/1986 |
| DE | 19817190 C1 | 7/1999 |
| JP | A 4-163268 | 6/1992 |
| JP | A 4-166463 | 6/1992 |
| JP | A 8-216869 | 8/1996 |
| JP | A 9-507663 | 8/1997 |
| JP | A 9-511967 | 12/1997 |
| JP | A 10-502889 | 3/1998 |
| JP | A 11-20672 | 1/1999 |

* cited by examiner

*Primary Examiner*—Xuan Lan Nguyen
(74) *Attorney, Agent, or Firm*—Oliff & Berridge, PLC

(57) ABSTRACT

A braking system including: a pressure control cylinder having a housing, a piston displaceable by activation of a drive source, and a pressure controlling chamber so that a working fluid can be supplied from the pressure controlling chamber to a brake cylinder, by displacement of the piston; and a braking pressure control device operable to control the activation of the drive source, for controlling a pressure of the working fluid in the pressure controlling chamber or in the brake cylinder. The braking-pressure control device includes: a piston-bottoming-state detecting portion operable to detect a piston-bottoming state of the pressure control cylinder and/or a possibility of occurrence of the piston-bottoming state; and a drive-source control portion operable to control the activation of the drive source on the basis of result of detection made by the piston-bottoming-state detecting portion.

24 Claims, 18 Drawing Sheets

FIG. 7

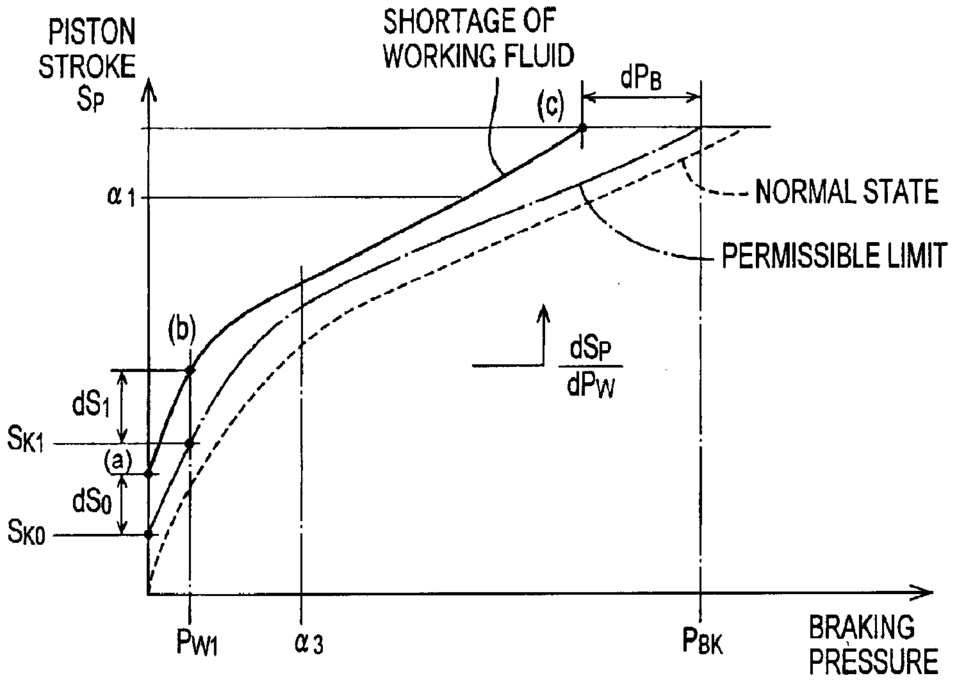

CONDITIONS FOR DETECTING POSSIBILITY OF PISTON-BOTTOMING STATE (a) $\begin{cases} P_W < |\beta_1| \\ S_P > S_{K0} \end{cases}$ $\beta_1$ : VALUE CLOSE TO ZERO (b) $\begin{cases} \beta_1 < P_W < P_{W1} \\ S_P > S_{K1} \end{cases}$

CONDITION FOR DETECTING PISTON-BOTTOMING STATE (c) $\begin{cases} S_P > |\beta_2| \\ P_W < P_{BK} \end{cases}$

CONDITION FOR DETECTING FAILURE OF EACH BRAKE-APPLICATION SECTION (d) $\begin{cases} S_P > \alpha_1 \\ \dfrac{dS_P}{dP_W} > \alpha_2 \\ P_W > \alpha_3 \end{cases}$

BRAKING SYSTEM HAVING PRESSURE CONTROL CYLINDER WHOSE PISTON IS DISPLACEABLE BY CONTROLLED DRIVE SOURCE

This application is based on Japanese Patent Application No. 2001-222960 filed in Jul. 24, 2001, the content of which is incorporated hereinto by reference.

BACKGROUND OF THE INVENTION

1. Field of the Invention

The present invention relates to a braking system including a pressure control cylinder whose piston is displaceable by activation of a drive source.

2. Discussion of Related Art

JP-A-9-511967 discloses a braking system including (a) a brake cylinder arranged to operate a brake with a hydraulic pressure, (b) a pressure control cylinder having (b-1) a housing, (b-2) a piston which is fluid-tightly fitted in the housing and which is displaceable relative to the housing by activation of a drive source, and (b-3) a chamber which is located on a front side of the piston and is connected to the brake cylinder, and (c) a braking-pressure control device operable to control the activation of the drive source, for controlling a fluid pressure in the chamber of the pressure control cylinder, to thereby control a fluid pressure in the brake cylinder.

SUMMARY OF THE INVENTION

It is therefore an object of the present invention to provide a braking system which has provision for eliminating problems conventionally encountered where a piston-bottoming state of the pressure control cylinder is occurred due to an insufficient increase in the fluid pressure of the pressure control cylinder, or where there is a possibility of occurrence of the piston-bottoming state.

The above object may be achieved by a braking system constructed according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system comprising:

a hydraulically operated brake cylinder capable of operating a brake;

a pressure control cylinder having a housing, a piston which is received in the housing and which is displaceable relative to the housing between front and rear stroke end positions by actuation or activation of a drive source, and a pressure controlling chamber which is located on a front side of the piston and which is connected to the brake cylinder, so that a working fluid can be supplied from the pressure controlling chamber to the brake cylinder, by displacement of the piston in a direction away from the rear stroke end position toward the front stroke end position; and a braking-pressure control device operable to control the activation of the drive source, for controlling a pressure of the working fluid in the pressure controlling chamber, so that a pressure of the working fluid in the brake cylinder can be controlled.

In the braking system of this mode (1) of the present invention, the pressure of the working fluid in the pressure controlling chamber, i.e., the pressure of the working fluid in the brake cylinder can be controlled by controlling the activation of the drive source which serves to displace the piston of the pressure control cylinder. The braking-pressure control device may be adapted to include, for example, at least one of a vehicle operator's-intention-basis control portion, a running-condition-basis control portion and a running-circumstance-basis control portion. The operator's-intention-basis control portion may be interpreted to mean a control portion operable to control the fluid pressure in the brake cylinder according to an operation of a manually operable brake operating member, for example, such that the fluid pressure in the brake cylinder provides a braking force desired by the vehicle operator. The running-condition-basis control portion may be interpreted to mean a control portion, such as anti-lock control portion, a traction control and a vehicle stability control, which is operable to control the fluid pressure depending upon a running condition of the vehicle. The running-circumstance-basis control portion may be interpreted to mean a control portion operable to control the fluid pressure depending upon a circumstance of the vehicle. As a kind of this running-circumstance-basis control portion, there is known a cruise control portion which is arranged to control the fluid pressure depending upon a positional relationship between the vehicle and a preceding vehicle, for example, such that a desired distance can be maintained between the two vehicles.

The piston of the pressure control cylinder may have a portion engaged with an output shaft of the drive source so that the piston is displaceable directly by the activation of the drive source, or may be displaceable by a fluid pressure applied thereto from a fluid pressure source which is activated by the drive source. In either of these cases, it is possible to reciprocate or displace the piston in the forward and reverse directions, by controlling the drive source, so that the fluid pressure in the pressure controlling chamber can be controlled. The drive source may be provided by, for example, an electric motor or other electrically operated actuator which is controlled by controlling an electric current applied thereto.

(2) A braking system according to mode (1), wherein the braking-pressure control device includes:

a piston-bottoming-state detecting portion operable to detect at least one of a piston-bottoming state in which the piston has reached almost in the front stroke end position while the pressure of the working fluid in the brake cylinder has not yet reached a predetermined level, and a possibility of occurrence of the piston-bottoming state; and a drive-source control portion operable to control the activation of the drive source on the basis of result of detection made by the piston-bottoming-state detecting portion.

The piston-bottoming-state portion may be adapted to detect either one of the piston-bottoming state and the possibility of occurrence of the piston-bottoming state, or may be adapted to detect both of the piston-bottoming state and the possibility of occurrence of the piston-bottoming state. In the latter case, the piston-bottoming state and the possibility of its occurrence may or may not be distinguished from each other.

The piston-bottoming state can be detected, for example, by determining whether the piston has almost reached in the front stroke end position. The possibility of occurrence of the piston-bottoming state can be detected, for example, on the basis of a relationship between the fluid pressure in the pressure controlling chamber (or in the brake cylinder) and a distance from the rear stroke end position to a position of the advanced piston. When a ratio of the fluid pressure to the distance is smaller than a predetermined value, it is possible to anticipate future occurrence of the piston-bottoming state, namely, it is possible to determine that there is a possibility of future occurrence of the piston-bottoming state, or a high possibility of future occurrence of the piston-bottoming state.

In general, the piston-bottoming state is occurred when an actual value of the braking force is smaller than a required value of the braking force. The piston is displaced in the forward direction, for example, as a result of an increase in an electric power supplied to the drive source in a response to an increase in the required value of the braking force. In this instance, there is a case where the piston reaches in the front stroke end position without the fluid pressure being increased to the required value. In the piston-bottoming state, the supply of the working fluid from the pressure control cylinder toward the brake cylinder can not be continued, making it impossible to further increase the fluid pressure. The piston-bottoming state is caused, for example, when the fluid pressure in the brake cylinder (or in the pressure controlling chamber) can not be sufficiently increased with an increase in the above-described distance (from the rear stroke end position to the position of the piston) because of a considerable amount of fluid leakage, or because of an increase in a braking clearance between a frictional engagement member (e.g., brake pads) and a rotor (e.g., brake drum or disk) in the brake. Further, the piston-bottoming state is caused also when a sufficient braking force can not be obtained due to a fade or other undesirable phenomenon. In this sense, the piston-bottoming-state detecting portion may be referred also to as a braking-force-deficiency detecting portion or a working-fluid-deficiency detecting portion.

In the braking system of this mode (2), the activation of the drive source is controlled on the result of the detection made by the piston-bottoming-state detecting portion. When at least one of the piston-bottoming state and the possibility of the occurrence is detected, the drive source can be controlled in a manner that is different from that when neither the piston-bottoming state nor the possibility of the occurrence is detected.

(3) A braking system according to mode (1) or (2), wherein the braking-pressure control device includes:

a piston-bottoming-state detecting portion operable to detect at least one of a piston-bottoming state in which the piston has reached almost in the front stroke end position while the pressure of the working fluid in the brake cylinder has not yet reached a predetermined level, and a possibility of occurrence of the piston-bottoming state; and a piston-displacement control portion operable to displace the piston in a reverse direction that is opposite to the direction as a forward direction and to displace the piston in the forward direction, when at least one of the piston-bottoming state and the possibility of occurrence of the piston-bottoming state is detected by the piston-bottoming-state detecting portion, the braking system further comprising a working-fluid-flow permitting device capable of permitting flow of the working fluid to the pressure controlling chamber from a portion of the braking system other than the brake cylinder, when the piston is displaced in the reverse direction.

The piston is reciprocated when at least one of the piston-bottoming state and the possibility of occurrence of the piston-bottoming state is detected. When the volume of the pressure controlling chamber is increased as a result of the displacement of the piston in the reverse direction, the fluid is supplied to the pressure controlling chamber via the working-fluid-flow permitting device. When the piston is displaced in the forward direction, the fluid is supplied from the pressure controlling chamber toward the brake cylinder. In this arrangement, it is possible to supply a larger amount of the working fluid to the brake cylinder, than where the piston is not reciprocated. The supply of the larger amount of working fluid facilitates an increase in the fluid pressure in the brake cylinder at a higher rate. In this arrangement, the pressure control cylinder serves as a pump. The piston displacement control portion of the braking-pressure control device can be referred to as a pump activating portion.

When the pressure controlling chamber and the brake cylinder are in communication with each other during the reverse movement of the piston, the working fluid is supplied to the pressure controlling chamber from the brake cylinder as a result of increase in the volume of the pressure controlling chamber. In this instance, owing to the working-fluid-flow permitting device, the working fluid is supplied to the pressure controlling chamber also from a portion of the braking system other than the brake cylinder, thereby making it possible to increase the amount of the working fluid to be supplied to the brake cylinder. In the braking system of this mode (3) in which the amount of the supply of working fluid to the brake cylinder is increased by the reciprocating motion of the piston of the pressure control cylinder, it is possible to prevent an insufficient increase in the fluid pressure which would be caused by a deficiency of the working fluid, without having to increase the size or capacity of the pressure control cylinder.

The working-fluid-flow permitting device may be adapted to permit flow of the working fluid into the pressure controlling chamber from either one of the master cylinder and the reservoir, or alternatively, may be adapted to permit flow of the fluid into the pressure controlling chamber from a rear pressure chamber located on a rear side of the piston of the pressure control cylinder, as described below. The working-fluid-flow permitting device may be constructed to include a check valve arranged to permit flow of the fluid into the pressure controlling chamber from a portion of the braking system other than the brake cylinder, or may be constructed to include an electromagnetically operated valve which is adapted to be placed in its open state during the reverse displacement of the piston of the pressure control cylinder. The construction of the working-fluid-flow permitting device will be described below in detail.

As described in modes (4)–(6) of the invention, the piston of the pressure control cylinder may be displaced in the reverse direction by a distance (which is determined on the basis of the fluid pressure in the pressure controlling chamber and a distance from the rear stroke end position to a position of the piston), before the piston is displaced in the forward direction. However, the piston may be displaced in the reverse direction by a predetermined distance each time the piston-bottoming state or the possibility of its occurrence is detected. Further, each time the piston-bottoming state or the possibility of its occurrence is detected, the piston may be reciprocated a predetermined number of times which number does not have to be one but may be two or more.

(4) A braking system according to mode (3), wherein the piston-displacement control portion includes a reverse-displacement-distance determining portion operable to determine a distance by which the piston is to be displaced in the reverse direction, on the basis of a relationship between the pressure of the working fluid in the pressure controlling chamber and a distance from the rear stroke end position to a position of the piston.

In an abnormal state in which the fluid pressure in the brake cylinder can not be increased to a required level because of a considerable amount of fluid leakage or an increase in the above-described clearance, a ratio of the fluid pressure in the pressure controlling chamber to a distance from the rear stroke end position to a position of the piston is smaller than that in a normal state. Therefore, it is possible to determine a degree of deficiency of the working fluid on the basis of the relationship between the fluid pressure and the distance. In the braking system of this mode (4) of the invention, the piston is displaced in the reverse direction by the distance which is determined on the basis of the relationship between the fluid pressure and the distance, namely, on the basis of the degree of fluid deficiency.

The distance, by which the piston is to be displaced in the reverse direction, may be determined, for example, on the basis of the above-described distance at a point of time at which the fluid pressure in the pressure controlling chamber reaches a predetermined value, or on the basis of the fluid pressure at a point of time at which the distance reaches a predetermined value. Further, the piston may be displaced in the reverse direction until the distance is reduced to a target distance value, or until the fluid pressure in the pressure controlling chamber is reduced to a target pressure value.

(5) A braking system according to mode (3) or (4), wherein the piston-displacement control portion includes a reverse-displacement-distance determining portion operable to determine a distance by which the piston is to be displaced in the reverse direction, on the basis of at least one of the pressure of the working fluid in the pressure controlling chamber upon detection of the piston-bottoming state or the possibility of occurrence by the piston-bottoming-state detecting portion, and a distance from the rear stroke end position to a position of the piston upon detection of the piston-bottoming state or the possibility of occurrence by the piston-bottoming-state detecting portion.

In the braking system of this mode (5), the required distance (by which the piston is to be displaced in the reverse direction), i.e., the degree of deficiency of the working fluid is easily determined on the basis of the fluid pressure and/or the stroke distance (from the rear stroke end position to the position of the piston) at the point of time at which the piston-bottoming state or the possibility of its occurrence is detected.

(6) A braking system according to any one of modes (3)–(5), wherein the piston-displacement control portion includes a reciprocation-number determining portion operable to determine a required number of times of reciprocations of the piston, on the basis of at least one of the pressure of the working fluid in the pressure controlling chamber, and a distance from the rear stroke end position to a position of the piston.

(7) A braking system according to any one of modes (3)–(6), further comprising a brake-cylinder cut-off valve disposed between the pressure controlling chamber and the brake cylinder, and having an open state in which the pressure controlling chamber and the brake cylinder are communicated with each other, and a closed state in which the pressure controlling chamber and the brake cylinder are isolated from each other, wherein the braking-pressure control device includes a brake-cylinder-cut-off-valve control portion operable to place the brake-cylinder cut-off valve in the closed state when the piston of the pressure control cylinder is displaced in the reverse direction.

In the open state of the brake-cylinder cut-off valve in which the pressure controlling chamber and the brake cylinder are communicated with each other, the fluid pressure in the brake cylinder is reduced when the piston is displaced in the reverse direction, namely, when the volume of the pressure controlling chamber is increased. On the other hand, in the closed state in which the pressure controlling chamber and the brake cylinder are isolated from each other, the fluid pressure in the brake cylinder is not reduced even when the volume of the pressure controlling chamber is increased. Therefore, it is possible to increase the fluid pressure in the brake cylinder and to prevent reduction in the fluid pressure in the brake cylinder, by placing the brake-cylinder cut-off valve in the open state during the forward displacement of the piston while placing the brake-cylinder cut-off valve in the closed state during the reverse displacement of the piston. It is preferable that the brake-cylinder cut-off valve is controlled to be switched from the closed state to the open state at a point of time at which the fluid pressure in the pressure controlling chamber has been increased to be larger than the fluid pressure in the brake cylinder.

The brake-cylinder cut-off valve may consist of a solenoid operated valve which is opened and closed by energization and de-energization of its coil, or a linear control valve the opening of which is variable with an amount of electric current applied to its coil so that a difference between pressures on opposite sides of the valve can be controlled to be proportional to the amount of the electric current.

In the braking system of this mode (7), the pressure controlling chamber of the pressure control cylinder can be considered to serve as a pump chamber. The brake-cylinder cut-off valve can be considered to serve as an outlet valve, while the working-fluid-flow permitting device can be considered to include an inlet valve.

(8) A braking system according to mode (7), wherein the hydraulically operated brake cylinder consists of a plurality of brake cylinders, the braking system further comprising:

a low-pressure source which stores the working fluid under a pressure substantially equal to an atmospheric pressure;

a plurality of individual pressure-control valve devices each including a pressure increasing valve and a pressure reducing valve, the pressure increasing valve being disposed between a corresponding one of the plurality of brake cylinders and the pressure controlling chamber, the pressure reducing valve being disposed between the corresponding one of the plurality of brake cylinders and the low-pressure source;

wherein the braking-pressure control device further includes an anti-lock braking control portion operable to control the pressure of the working fluid in each of the plurality of brake cylinders such that a degree of wheel slipping is held within a predetermined range, by controlling at least one of the pressure increasing valve and the pressure reducing valve;

and wherein the brake-cylinder cut-off valve is provided by the pressure increasing valve.

In the braking system of this mode (8), the pressure increasing valve is used as the brake-cylinder cut-off valve. This arrangement eliminates necessity of a valve serving exclusively for isolating the brake cylinder and the pressure controlling chamber from each other, thereby leading to a reduced cost of manufacturing of the baking system.

(9) A braking system according to any one of modes (3)–(8), further comprising a working fluid source, wherein the working-fluid-flow permitting device includes an inlet valve which is disposed between the working fluid source and the pressure controlling chamber and which is capable of permitting flow of the working fluid from the working fluid source toward the pressure controlling chamber when the piston is displaced in the reverse direction.

In the braking system of this mode (9), the working fluid is supplied from the working fluid source to the pressure controlling chamber via the inlet valve, so that the supplied working fluid is pressurized in the pressure controlling chamber. The pressurized working fluid is then delivered to the brake cylinder. The inlet valve may consist of a check valve which is arranged to permit flow of the working fluid from the working fluid source toward the pressure controlling chamber and to inhibit flow of the working fluid from pressure controlling chamber toward the working fluid source, or may consist of an electromagnetically operated valve which is adapted to be placed in its open state during the reverse displacement of the piston of the pressure control cylinder and placed in its closed state during the forward displacement of the piston of the pressure control cylinder. The working fluid source may consist of a reservoir which stores the working fluid under the atmospheric pressure, an accumulator which stores the working fluid pressurized by a pump device, or a master cylinder which pressurizes the working fluid to a level proportional to an operating force that is applied to a brake operating member by a vehicle operator. It is noted that the inlet valve may be disposed between the pressure controlling chamber and the reservoir, or may be disposed between the pressure controlling chamber and a portion from which the working fluid can be supplied to the pressure controlling chamber during the reverse displacement of the piston.

(10) A braking system according to any one of modes (3)–(9), further comprising:

a master cylinder operable according to an operation of a brake operating member, to pressurize the working fluid; and a master-cylinder cut-off valve disposed between the pressure controlling chamber and the master cylinder, and having an open state in which the pressure controlling chamber and the master cylinder are communicated with each other, and a closed state in which the pressure controlling chamber and the master cylinder are isolated from each other, wherein the braking-pressure control device includes a master-cylinder-cut-off-valve control portion operable to place the master-cylinder cut-off valve in the open state when the piston is displaced in the reverse direction, and wherein the working-fluid-flow permitting device is provided by the master-cylinder cut-off valve.

In the baking system of this mode (10) in which the master-cylinder-cut-off valve is controlled to be placed in its open state during the reveres displacement of the control piston, the working fluid can be supplied to the pressure controlling chamber of the pressure control cylinder. This arrangement, in which the master-cylinder-cut-off valve serves as the working-fluid-flow permitting device, eliminates necessity of a device serving exclusively as the working-fluid-flow permitting device, thereby leading to a reduced cost of manufacturing of the baking system.

(11) A braking system according to mode (7) or (8), wherein the pressure control cylinder further has a rear pressure chamber which is located on a rear side of the piston, the braking system further comprising:

a working-fluid-supply permitting device which is capable of permitting supply of the working fluid from the rear pressure chamber toward the brake cylinder without passage of the working fluid through the brake-cylinder cut-off valve when the piston is displaced in the reverse direction; and a working-fluid-flow inhibiting device which is capable of inhibiting flow of the working fluid from the rear pressure chamber toward a portion of the braking system other than the brake cylinder when the piston is displaced in the reverse direction.

(12) A braking system according to mode (11), wherein the working-fluid-flow inhibiting device includes a flow permitting portion which is capable of permitting flow of the working fluid toward the rear pressure chamber when the piston is displaced in the forward direction.

(13) A braking system according to mode (11) or (12), wherein the working-fluid-supply permitting device includes a check valve which is capable of permitting flow of the working fluid from the rear pressure chamber toward the brake cylinder and inhibiting flow of the working fluid from the brake cylinder toward the rear pressure chamber.

In the braking system of each of modes (11)–(13), the working fluid in the rear pressure chamber is pressurized as a result of the reverse displacement of the piston, and the pressurized working fluid is then supplied to the brake cylinder via the working-fluid-supply permitting device. This arrangement makes it possible to increase the fluid pressure in the brake cylinder even during the reverse displacement of the piston of the pressure control cylinder. The working-fluid-supply permitting device may be provided, for example, by a by-pass fluid passage communicating the rear pressure chamber with a portion of a fluid passage through which the pressure controlling chamber and the brake cylinder are connected to each other through the brake-cylinder cut-off valve, wherein the portion is located on one of opposite sides of the brake-cylinder cut-off valve which is closer to the brake cylinder rather than to the pressure controlling chamber.

In the braking system of mode (12), the working fluid is supplied to the rear pressure chamber via the flow permitting portion during the forward displacement of the piston, and the working fluid is delivered from the rear pressure chamber to the brake cylinder via the working-fluid-supply permitting device. Thus, the rear pressure chamber is considered to serve as a pump chamber.

The working-fluid-supply permitting device may include an electromagnetically operated valve which is adapted to be placed in its open state during the reverse displacement of the piston and placed in its closed state during the forward displacement of the piston, or may include a check valve which is arranged to permit flow of the working fluid from the rear pressure chamber toward the brake cylinder and to inhibit flow of the working fluid from the brake cylinder toward the rear pressure chamber. In either of these cases, while the fluid pressure in the brake cylinder is higher than that in the rear pressure chamber during the forward displacement of the piston, the flow of the working fluid from the brake cylinder toward the rear pressure chamber is reliably inhibited, thereby preventing reduction in the fluid pressure in the brake cylinder.

(14) A braking system according to any one of modes (11)–(13), wherein the piston of the pressure control cylinder has a rear pressure-receiving surface partially defining the rear pressure chamber and a front pressure-receiving surface partially defining the pressure controlling chamber, and wherein the rear pressure-receiving surface has an area that is smaller than an area of the front pressure-receiving surface.

In the braking system of this mode (14) in which the rear pressure-receiving surface area of the piston is smaller than the front pressure-receiving surface area of the piston, a required amount of the displacement of the piston for supplying a certain amount of the working fluid to the brake cylinder is larger where the supply of the working fluid is made by the reverse displacement of the piston, than where the supply of the working fluid is made by the forward displacement of the piston. However, a driving force required for the reverse displacement of the piston is smaller than that required for the forward displacement of the piston. This means that it is not possible to supply the working fluid to the brake cylinder at a higher rate by the reverse displacement of the piston than by the forward displacement of the piston, but it is possible to increase the fluid pressure in the brake cylinder to a higher level by the reverse displacement of the piston than by the forward displacement of the piston. That is, even where the driving source does not have a large capacity, the fluid pressure in the brake cylinder can be increased to a sufficiently high level by the reverse displacement of the piston. In general, it is not necessary to supply a large amount of the working fluid to the brake cylinder at a high rate, where the fluid pressure has reached almost a required high level.

(15) A braking system according to any one of modes (3)–(14), wherein the pressure control cylinder further has a rear pressure chamber which is located on a rear side of the piston, the braking system further comprising:

a working fluid source; and an inlet valve which is disposed between the working fluid source and the rear pressure chamber, and which is capable of permitting flow of the working fluid from the working fluid source toward the rear pressure chamber and inhibiting flow of the working fluid from the rear pressure chamber toward the working fluid source.

(16) A braking system according to mode (15), further comprising an outlet valve which is disposed between the rear pressure chamber and the pressure controlling chamber, and which is capable of permitting flow of the working fluid from the rear pressure chamber toward the pressure controlling chamber and inhibiting flow of the working fluid from the pressure controlling chamber toward the rear pressure chamber, wherein the working-fluid-flow permitting device is provided by the outlet valve.

In the braking system of each of modes (15) and (16), the working fluid is supplied from the working fluid source to the rear pressure chamber via the inlet valve, so that the working fluid pressurized in the rear pressure chamber can be supplied to the pressure controlling chamber. The inlet valve, which is arranged to inhibit the flow of the working fluid from the rear pressure chamber toward the working fluid source, serves as the above-described working-fluid-flow inhibiting device.

In the braking system of mode (16), the outlet valve may be provided by an annular cup seal which is fitted on an outer circumferential surface of the piston. The provision of the annular cup seal eliminates, for example, a need of provision of a fluid passage and a check valve between the rear pressure chamber and the pressure controlling chamber, thereby making it possible to reduce the number of the required components, leading to a reduced cost of manufacturing of the baking system.

(17) A braking system according to any one of modes (1)–(16), further comprising:

a master cylinder having a master-cylinder housing, and a master-cylinder piston which is displaceably received in the master-cylinder housing and which is connected to a brake operating member, the master cylinder being connected to the brake cylinder so that the working fluid can be supplied from the master cylinder to the brake cylinder, by forward displacement of the master-cylinder piston relative to the master-cylinder housing in response to an operation of the brake operating member;

wherein the braking-pressure control device includes a fast-filling control portion operable to control amount of flow of the working fluid from the master cylinder toward the brake cylinder such that a ratio of the amount of flow of the working fluid to an amount of the forward displacement of the master-cylinder piston is made larger when the pressure of the working fluid in the brake cylinder is not larger than a predetermined threshold value, than when the pressure of the working fluid in the brake cylinder is larger than the predetermined threshold value, and wherein the braking-pressure control device controls the activation of the drive source for thereby controlling the pressure of the working fluid in the pressure controlling chamber, while the brake cylinder is isolated from the master cylinder.

In the braking system of this mode (17), the amount of the supply of the working fluid from the master cylinder to the brake cylinder as a result of a certain amount of the forward displacement of the piston is made larger when the fluid pressure in the brake cylinder is not larger than the predetermined threshold value than when the fluid pressure in the brake cylinder is larger than the predetermined threshold value. The fluid pressure in the brake cylinder is controlled by controlling the pressure control cylinder, while the braking cylinder is isolated from the master cylinder. The brake cylinder may be isolated from the master cylinder when the fluid pressure in the brake cylinder is not smaller than the above-described predetermine threshold value, or may be isolated from the master cylinder when the fluid pressure in the brake cylinder is not smaller than another predetermined value different from the predetermined threshold value.

(18) A braking system according to mode (17), further comprising a master-cylinder cut-off valve which is disposed between the pressure controlling chamber and the master cylinder, the master-cylinder cut-off valve having an open state in which the pressure controlling chamber and the master cylinder are communicated with each other, and a closed state in which the pressure controlling chamber and the master cylinder are isolated from each other, wherein the fast-filling control portion of the braking-pressure control device switches the master-cylinder cut-off valve from the open state to the closed state when the pressure of the working fluid is increased to the predetermined threshold value.

(19) A braking system according to mode (17) or (18), wherein the master-cylinder piston of the master cylinder includes a large-diameter portion and a small-diameter portion, and cooperates with the master-cylinder housing to define first and second pressurizing chambers, such that the working fluid can be supplied from the first and second pressurizing chambers to the brake cylinder, by the forward displacement of the master-cylinder piston relative to the master-cylinder housing, the braking system further comprising:

a working fluid source; and an outflow inhibiting valve which is disposed between the working fluid source and the first pressurizing chamber, and which is controlled by the fast-filling control portion of the braking-pressure control device, such that the outflow inhibiting valve inhibits flow of the working fluid from the first pressurizing chamber toward the working fluid source when the pressure of the working fluid in the brake cylinder is not larger than the predetermined threshold value, and such that the outflow inhibiting valve permits the flow of the working fluid from the first pressurizing chamber toward the working fluid source when the pressure of the working fluid in the brake cylinder is larger than the predetermined threshold value.

While the flow of the working fluid from the first pressurizing chamber toward the working fluid source is being inhibited, the fluid pressure in the first pressurizing chamber as well as the fluid pressure in the second pressurizing chamber is increased as a result of the forward displacement of the master-cylinder piston, whereby the working fluid is supplied to the brake cylinder from the first and second pressurizing chambers. On the other hand, while the flow of the working fluid from the first pressurizing chamber toward the working fluid source is being permitted, the working fluid is discharged from the first pressurizing chamber toward the working fluid source, so that the working fluid is supplied to the brake cylinder from the second pressurizing chamber, without being supplied to the brake cylinder from the first pressurizing chamber. Thus, the outflow inhibiting valve provides a selected one of an outflow inhibiting state in which the working fluid is supplied to the brake cylinder from the first and second pressurizing chambers, and an outflow permitting state in which the working fluid is supplied to the brake cylinder from the second pressurizing chamber without being supplied to the brake cylinder from the first pressurizing chamber.

Where the working fluid is supplied to the brake cylinder from both of the first and second pressurizing chambers, the working fluid in the first pressurizing chamber may be supplied to the brake cylinder via the second pressurizing chamber, or may be supplied to the brake cylinder independently of the supply of the working fluid from the second pressurizing chamber to the brake cylinder. In the former case, the first and second pressurizing chambers can be communicated with each other through a passage which may be provided within the master cylinder or outside the master cylinder. In the latter case, the first and second pressurizing chambers are connected to respective fluid passages, which merge with each other on the way to the brake cylinder. In either of these cases, it is preferable to provide, between the first pressurizing chamber and the second pressurizing chamber or between the first pressurizing chamber and the brake cylinder, a check valve which is arranged to permit flow of the working fluid in a direction from the first pressurizing chamber toward the second pressurizing chamber or the brake cylinder and to inhibit flow of the working fluid in the reverse direction. Where the first pressurizing chamber is connected to a working fluid source in the form of a low-pressure source, the provision of the check valve is effective to prevent flow of the highly pressurized fluid from the second pressurizing chamber or the brake cylinder to the low-pressure source via the first pressurizing chamber.

The outflow inhibiting valve may consist of a solenoid operated valve which is opened and closed by energization and de-energization of its coil, or a linear control valve the opening of which is variable with an amount of electric current applied to its coil so that a difference between pressures on opposite sides of the valve can be controlled to be proportional to the amount of the applied electric current. The amount of the electric current applied to the outflow inhibiting valve is controlled by an outflow-inhibiting-valve control portion such that the outflow inhibiting valve is placed in a selected one of its open and closed states.

(20) A braking system according to mode (19), further comprising a master-cylinder cut-off valve which is disposed between the pressure controlling chamber and the master cylinder, the master-cylinder cut-off valve having an open state in which the pressure controlling chamber and the master cylinder are communicated with each other, and a closed state in which the pressure controlling chamber and the master cylinder are isolated from each other, wherein the braking-pressure control device includes a valve control portion operable to place the master-cylinder cut-off valve in the closed state and to place the outflow inhibiting device in a flow-permitting state for permitting the flow of the working fluid from the first pressurizing chamber toward the working fluid source, when the pressure of the working fluid in the brake cylinder is larger than the predetermined threshold value.

(21) A braking system according to any one of modes (17)–(20), wherein the fast-filling control portion of the braking-pressure control device includes:

a piston-bottoming-state detecting portion operable to detect at least one of a piston-bottoming state in which the piston of the pressure control cylinder has reached almost in the front stroke end position while the pressure of the working fluid in the brake cylinder has not yet reached a predetermined level, and a possibility of occurrence of the piston-bottoming state; and a pressure-threshold-value determining portion operable to determine the threshold value such that the threshold value is larger when at least one of the piston-bottoming state and the possibility of occurrence of the piston-bottoming state is detected, than when neither the piston-bottoming state nor the possibility of occurrence of the piston-bottoming state is detected.

For example, where the master-cylinder cut-off valve is switched from its open state to its closed state when the fluid pressure in the brake cylinder is increased to the predetermined threshold value, the control of the fluid pressure by means of the pressure control cylinder is initiated at the point of time at which the fluid pressure in the brake cylinder reaches the predetermined threshold value. In this instance, the fluid pressure in the pressure controlling chamber, as well as the fluid pressure in the bake cylinder, has been already increased to the predetermined threshold value, while the piston is almost in its rear end stroke end position, namely, while the distance from the rear stroke end position to the position of the piston is still substantially zero. This means that an amount of the working fluid accommodated in the brake cylinder upon initiation of the control of the fluid pressure by the pressure control cylinder is increased with an increase in the threshold value of the fluid pressure. Therefore, in the braking system of this mode (21) in which the threshold value is increased when the piston-bottoming state and/or the possibility of its occurrence are detected, it is possible to avoid a deficiency of the working fluid within the pressure controlling chamber, thereby reducing the possibility of occurrence of the piston-bottoming state in the next brake control cycle. For example, where the piston-bottoming state or the possibility of its occurrence is detected in the current brake control cycle, namely, where the detection of the piston-bottoming state or the possibility of its occurrence is very probable also in the next brake control cycle, it is preferable that a larger amount of the working fluid is supplied to the brake cylinder before the initiation of the control of the fluid pressure by the pressure control cylinder (before the brake cylinder is isolated from the master cylinder) in the next brake control cycle. The threshold value is preferably determined on the basis of the fluid pressure in the pressure controlling chamber and/or the piston position at the point of time of detection of the piston-bottoming state or the possibility of its occurrence, as in the braking system of mode (22). However, the threshold value may be determined irrespective of such data or values upon detection of the piston-bottoming state or the possibility of its occurrence. In this case, the threshold value is made larger where the piston-bottoming state or the possibility of its occurrence is detected, than where neither the piston-bottoming state nor the possibility of its occurrence is detected.

(22) A braking system according to mode (21), wherein the pressure-threshold-value determining portion includes a bottoming-information-basis determining portion operable to determine the threshold value on the basis of at least one of the pressure of the working fluid in the pressure controlling chamber upon detection of the piston-bottoming state or the possibility of occurrence by the piston-bottoming-state detecting portion, and a distance from the rear stroke end position to a position of the piston upon detection of the piston-bottoming state or the possibility of occurrence by the piston-bottoming-state detecting portion.

The possibility of occurrence of the piston-bottoming state can be reduced, by increasing the above-described threshold value with an increase in deficiency of the working fluid. However, in general, an increase in the threshold value leads to an extended period in which the working fluid is pressurized by the large-diameter portion of the master-cylinder piston, thereby deteriorating a feeling given to the vehicle operator who operates the brake operating member. In the braking system of this mode (22), a degree of deficiency of the working fluid in the pressure controlling chamber, i.e., a degree of possibility of the piston-bottoming state is estimated by taking account of the fluid pressure or the piston position upon detection of the piston-bottoming state or the possibility of its occurrence. That is, in the present braking system, it is possible to determine the threshold value by taking account of the degree of deficiency of the working fluid or the degree of possibility of the piston-bottoming state, such that the piston-bottoming state can be avoided without considerably deteriorating a feeling given to the vehicle operator during his operation of the brake operating member.

(23) A braking system according to any one of modes (17)–(22), further comprising a stroke simulator which is allowed to be operable when the brake cylinder is isolated from the master cylinder.

In the braking system of this mode (23) in which the stroke simulator is allowed to be placed in its operable state when the brake cylinder is isolated from the master cylinder, it is possible to prevent a deterioration in a feeling given to the vehicle operator during his operation of the brake operating member. The master-cylinder cut-off valve may be controlled to be placed in its closed state when the fluid pressure in the brake cylinder exceeds the predetermined threshold value, it is possible to avoid a change in characteristics of a reaction force applied to the brake operating member by the stroke simulator during the control of the fluid pressure by the pressure control cylinder, whereby a stable and constant feeling is given to the vehicle operator.

(24) A braking system according to any one of modes (1)–(23), further comprising:

a master cylinder operable according to an operation of a brake operating member, to pressurize the working fluid; and a master-cylinder cut-off valve disposed between the pressure controlling chamber and the master cylinder, and having an open state in which the pressure controlling chamber and the master cylinder are communicated with each other, and a closed state in which the pressure controlling chamber and the master cylinder are isolated from each other, wherein the braking-pressure control device includes:

a working-fluid-deficiency detecting portion which is operable to detect at least one of a deficiency of the working fluid within the pressure controlling chamber and a possibility of occurrence of the deficiency, while the pressure of the working fluid in the brake cylinder is controlled by the pressure control cylinder, with the master-cylinder cut-off valve being held in the closed state; and a piston-displacement control portion operable to displace the piston in a reverse direction that is opposite to the direction as a forward direction and to displace the piston in the forward direction, when at least one of the deficiency of the working fluid and the possibility of occurrence of the deficiency is detected by the working-fluid-deficiency detecting portion.

(25) A braking system according to any one of modes (1)–(24), wherein the braking-pressure control device includes a piston-reciprocation control portion operable to control the activation of the drive source for thereby displacing the piston in a reverse direction that is opposite to the direction as a forward direction and displacing the piston in the forward direction.

In the braking system of this mode (25), there is a case where the piston of the pressure control cylinder is displaced in the reverse direction even without purpose of reducing the fluid pressure in the brake cylinder. For example, where the fluid pressure in the brake cylinder is required to be increased rather than to be reduced, the piston is first reversed and then advanced, whereby the fluid pressure can be made larger than before the reciprocating motion of the piston.

(26) A braking system according to any one of modes (1)–(25), further comprising:

a master cylinder operable according to an operation of a brake operating member, to pressurize the working fluid; and a master-cylinder cut-off valve disposed between the pressure controlling chamber and the master cylinder, and having an open state in which the pressure controlling chamber and the master cylinder are communicated with each other, and a closed state in which the pressure controlling chamber and the master cylinder are isolated from each other, wherein the braking-pressure control device includes:

a master-cylinder-cut-off-valve control portion operable to switch the master-cylinder-cut-off valve from the open state to the closed state when the pressure of the working fluid is increased to a predetermined threshold value;

a piston-bottoming-state detecting portion operable to detect at least one of a piston-bottoming state in which the piston of the pressure control cylinder has reached almost in the front stroke end position while the pressure of the working fluid in the brake cylinder has not yet reached a predetermined level, and a possibility of occurrence of the piston-bottoming state; and a pressure-threshold-value determining portion operable to determine the threshold value such that the threshold value is larger when at least one of the piston-bottoming state and the possibility of occurrence of the piston-bottoming state is detected, than when neither the piston-bottoming state nor the possibility of occurrence of the piston-bottoming state is detected.

The threshold value, at which the master-cylinder cut-off valve is switched from its open state to its closed state, can be determined depending upon the possibility of occurrence of the piston-bottoming state, irrespective of fast-filling of the brake cylinder. Where the piston-bottoming state or the possibility of its occurrence has been detected in the last brake control cycle, the threshold value is increased since the detection of the piston-bottoming state or the possibility of its occurrence is very probable in the current brake control cycle. By increasing the threshold value, it is possible to increase the amount of the working fluid to be supplied to the brake cylinder prior to the initiation of the control of the fluid pressure by the pressure control cylinder.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 7 is a graph indicating a relationship between a braking pressure and a position of a piston of the pressure control cylinder;

DETAILED DESCRIPTION OF THE PREFERRED EMBODIMENTS

Figure 1:
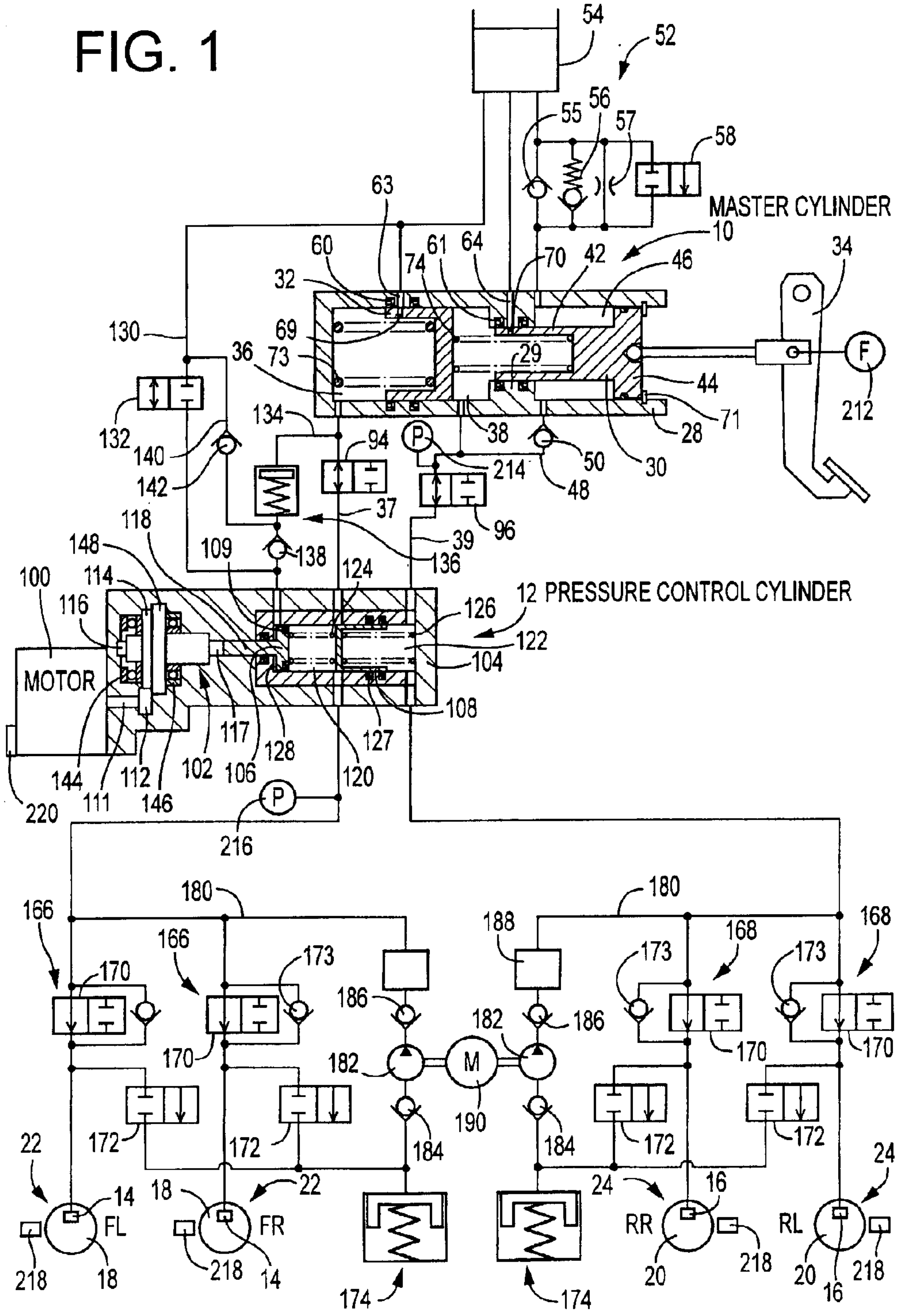
FIG. 1 is a hydraulic circuit diagram of a braking system according to a first embodiment of this invention.

Referring to first to FIG. 1, there is shown a braking system for an automotive vehicle, which braking system is constructed according to a first embodiment of the present invention. In FIG. 1, reference sign 10 denotes a master cylinder, while reference sign 12 denotes a pressure control cylinder. Reference signals 14 and 16 respectively denote front and rear wheel brake cylinders of front and rear wheel brakes 22, 24 arranged to brake respective front and rear wheels 18, 20. The wheel brake cylinders 14, 16 are connected to the master cylinder 10 through the pressure control cylinder 12.

The master cylinder 10 includes a housing 28, and two pressurizing pistons 30, 32 fluid-tightly and slidably received within the housing 28. The housing 28 has an annular protrusion 29 which radially inwardly protrudes from an axially intermediate portion of an inner circumferential surface of the housing 28. The pressurizing piston 30 is connected to a manually operable brake operating member in the form of a brake pedal 34. The pressurizing piston 32 partially defines a pressurizing chamber 36 in front of it, while the pressurizing piston 30 partially defines a pressurizing chamber 38 in front of it. The front wheel brake cylinders 14 for the front wheels 18 are connected to the pressurizing chamber 36 through a fluid passage 37, while the rear wheel brake cylinders 16 for the rear wheels 20 are connected to the pressurizing chamber 38 through a fluid passage 39. Upon operation of the master cylinder 10, masses of a working fluid in the two pressurizing chambers 36, 38 are pressurized to the same level.

The pressurizing piston 30 is a stepped cylinder member including a front small-diameter portion 42 and a rear large-diameter portion 44 having a large diameter than the small-diameter portion 42. The small-diameter portion 42 is fitted in the annular protrusion 29 of the housing 28. The small-diameter portion 42 cooperates with a bottom surface of the pressurizing piston 32, the inner circumferential surface of the housing 28 and a front axial end face of the annular protrusion 29 to define the pressurizing chamber 38. The small-diameter portion 42 cooperates with a rear axial end face of the annular protrusion 29, the inner circumferential surface of the housing 28 and a front axial end face of the large-diameter portion 44 to define an annular chamber 46. The annular chamber 46 is connected to a fluid passage 48 as a branch fluid passage which is merged into the fluid passage 39 as a common fluid passage. The branch fluid passage 48 is provided with a check valve 50 which permits flow of the fluid in a direction from the annular chamber 46 toward the common fluid passage 39 but inhibits flow of the fluid in the reverse direction. The flow of the fluid from the pressurizing chamber 38 toward the annular chamber 46 is inhibited by the check valve 50. In the present embodiment, the annular chamber 46 constitutes a first pressurizing chamber, while the pressurizing chamber 38 constitutes a second pressurizing chamber.

The annular chamber 46 is connected to a reservoir 54 through a flow restricting device 52. The reservoir 54, serving as a working fluid source, stores the working fluid under a pressure almost equal to the atmospheric pressure. The flow restricting device 52 includes a check valve 55, a pressure-relief valve 56, an orifice 57 and an outflow inhibiting valve 58, which are connected in parallel to each other. The check valve 55 permits flow of the fluid in a direction from the reservoir 54 toward the annular chamber 46 but inhibits flow of the fluid in the reverse direction. The pressure-relief valve 56 permits flow of the fluid in the direction from the annular chamber 46 toward the reservoir 54 when the fluid pressure in the annular chamber 46 is higher than that in the reservoir 54 by more than a predetermined amount, that is, higher than a predetermined relief pressure. The check valve 55 serves to prevent the pressure in the annular chamber from being reduced to be smaller than the atmospheric pressure, for example, when the volume of the annular chamber 46 is increased as a result of the reverse displacement of the pressurizing piston 30. The pressure-relief valve 56 serves as a safety valve for avoiding an excessive increase in the fluid pressure in the annular chamber 46, to thereby prevent the forward displacement of the pressurizing piston, 30 from being inhibited.

The outflow inhibiting valve 58 consists of a solenoid operated valve which is selectively placed in its open or closed state by energization or de-energization of its coil. In the open state, the outflow inhibiting valve 58 permits flow of the working fluid from the annular chamber 46 toward the reservoir 54. In the closed state, the outflow inhibiting valve 58 inhibits the flow of the working fluid from the annular chamber 46 toward the reservoir 54. In the present embodiment, the outflow inhibiting valve 58 is placed in its closed state while the fluid pressure in each of the brake cylinders 14, 16 is not larger than a predetermined threshold value. The outflow inhibiting valve 58 is switched from the closed state to the open state when the fluid pressure in each of the brake cylinders 14, 16 is increased to be larger than the predetermined threshold value. With the outflow inhibiting valve 58 being placed in the closed state, the fluid pressure in the annular chamber 46 is increased as a result of the forward displacement of the pressurizing piston 30, whereby the working fluid is supplied from the annular chamber 46 toward the brake cylinders 14, 16. With the outflow inhibiting valve 58 being placed in the open state, the fluid pressure in the annular chamber 46 is not increased by the forward displacement of the pressurizing piston 30, so that the working fluid is not supplied from the annular chamber 46 toward the brake cylinders 14, 16.

Where the above-described threshold value is determined to correspond to a pressure value at which the wheel brake cylinders 14, 16 are considered to have been fast-filled with the pressurized working fluid, namely, at which the fast filling of the wheel brake cylinders 14, 16 is considered to be completed, it is possible to supply the working fluid to the brake cylinders 14, 16 at a comparatively high rate until the fast filling of the brake cylinders 14, 16 is completed. Accordingly, the fast filling can be completed in a relatively short time. In this sense, the outflow inhibiting valve 58 can be referred to as a fast-filling control valve.

In the present embodiment, the above-described threshold value is determined on the basis of the pressure value at which the fast filling of the wheel brake cylinders 14, 16 is considered to be completed. However, where a piston-bottoming state of the pressure control cylinder 12 has been detected in the last brake control cycle, a piston position and a value of the fluid pressure in the pressure control cylinder 12 upon the defection of the piston-bottoming state are also taken into consideration in determining the threshold value. It is noted that the threshold value may be a value which is not related with the fast filling of the wheel brake cylinders 14, 16. That is, it is also possible to determine the threshold value based on the piston position and the fluid pressure value in the pressure control cylinder 12 upon the detection of the piston-bottoming state, without taking account of the fast filling of the wheel brake cylinders 14, 16.

A pair of annular cup seals 60, 60 are provided to be fitted in a portion of the inner circumferential surface of the housing 28, in which portion the pressurizing piston 32 is slidably received. Similarly, another pair of annular cup seals 61, 61 are provided to be fitted in an inner circumferential surface of the annular protrusion 29, in which the front small-diameter portion 42 of the pressurizing piston 30 is slidably received. The housing 28 has two radial holes 63, 64 formed therethrough. The two radial holes 63, 64 serve as ports 63, 64 which are connected to the reservoir 54 through respective fluid passages. The port 63 is located between the pair of annular cup seals 60, 60, while the port 64 is located between the pair of annular cup seals 61, 61. The pressurizing pistons 32, 30 have respective two radial holes 69, 70 formed therethrough. The two radial holes 69, 70 serves as communication passages 69, 70. When the communication passages 69, 70 are positioned to be opposed to the respective ports 63, 64, the pressurizing chambers 36, 38 are brought into communication with the reservoir 54, thereby permitting fluid of the working fluid from the pressurizing chambers 36, 38 toward the reservoir 54 As shown in FIG. 1, when the pressurizing pistons 32, 30 are positioned in their respective rear stroke end positions, the communication passages 69, 70 are positioned to be opposed to the respective ports 63, 64. An annular stopping member 71 is provided to inhibit the piston 30 from being further displaced from its rear stroke end position in the reverse direction. A return spring 73 is interposed between a bottom wall of the housing 28 and the piston 32, while another return spring 74 is interposed between the pistons 32, 30, so that the piston 32 interposed between the two return springs 73, 74 is positioned in its rear stroke end position when the piston 30 is held in contact with the annular stopping member 71, namely, when the piston 30 is positioned in its rear stroke end position.

The fluid passages 37, 39 are connected to the pressure control cylinder 12. The fluid passages 37, 39 are provided with respective master-cylinder cut-off valves 94, 96, each of which consists of a solenoid operated valve. Each of the master-cylinder cut-off valves 94, 96 is positioned between the master cylinder 10 and the pressure control cylinder 12. The wheel brake cylinders 14, 16 are selectively connected and disconnected to and from the master cylinder 10, by selectively opening and closing the respective master-cylinder cut-off valves 94, 96. Each of these cut-off valves 94, 96 is a normally open valve that is placed in its open state when an electric current is not supplied to the valve. The cut-off valves 94, 96 are placed in their closed states, as a principle, when the fluid pressures in the brake cylinders are controlled by controlling the pressure control cylinder 12.

The pressure control cylinder 12 is operated according to activation of a drive source in the form of an electrically operated pressure control motor 100, which is operable in the opposite directions. A rotary motion of the pressure control motor 100 is converted by a motion converting device 102 into a linear motion. The pressure control cylinder 12 includes a housing 104, and two control pistons 106, 108 fluid-tightly and slidably received in the housing 104. An annular cup seal 109 is mounted on an outer circumferential surface of the control piston 106, to maintain fluid tightness between the control piston 106 and the housing 104. This annular cup seal 109 permits flow of the fluid in a direction from a chamber located on its rear side toward a chamber located on its front side, but inhibits flow of the fluid in the reverse direction, as described later.

As shown in FIG. 1, a rotary motion of an output shaft 111 of the pressure control motor 100 is transmitted through a pair of gears 112, 114 to a rotary shaft 116. A rotary motion of this rotary shaft 116 is converted by the motion converting device 102 into a linear motion of a drive shaft 117 which is connected to a piston rod 118 of the control piston 106. In this arrangement, the control piston 106 is advanced and retracted depending upon whether the pressure control motor 100 is operated in the forward or reverse direction. The control piston 106 is displaceable relative to the housing 104 between its front and rear stroke end positions by the activation of the pressure control motor 100.

The control pistons 106, 108 partially define respective pressure controlling chambers 120, 122 on their front sides (on their right sides as seen in FIG. 1). To these pressure controlling chambers 120, 122, there are connected the respective brake cylinders 14, 16 for the front and rear wheels 18, 20, and the respective pressurizing chambers 36, 38. Thus, the master cylinder 10 and the brake cylinders 14, 16 are connected to each other through the pressure controlling chambers 120, 122.

The two control pistons 106, 108 are disposed coaxially and in series with each other. A return spring 124 is interposed between the two control pistons 106, 108, while another return spring 126 is interposed between the control piston 108 and the housing 104. Upon operation of the master cylinder 10, masses of a working fluid in the two pressurizing chambers 36, 38 are pressurized to the same level. The control piston 108 is moved on the basis of the fluid pressures in the pressure controlling chambers 120, 122. In this sense, the control piston 108 may be referred to as a pressure-differential piston or floating piston. The control piston 108 has opposite pressure-receiving surfaces which partially define the respective pressure controlling chambers 120, 122 and which have the same area, and the two return springs 124, 126 have substantially the same biasing force, so that the fluid pressures in the two pressure controlling chambers 120, 122 are controlled to be substantially equal to each-other. Accordingly, the fluid pressures in the brake cylinders 14, 16 for the front and rear wheels 18, 20 are controlled in the same manner by the pressure control cylinder 12, so as to be substantially equal to each other. In other words, the fluid pressures in the brake cylinders 14, 16 can be increased and reduced concurrently with each other, by controlling the activation of the pressure control motor 100. The control piston 108 is fluid-tightly and slidably received in the housing 104 through a pair of annular sealing members 127, which maintain the two pressure controlling chambers 120, 122 to be independent of each other so that two brake-application sections are held independent of each other, namely, so that the front wheel brake cylinders 14 and the rear wheel brake cylinders 16 are held independent of each other. This arrangement is effective to protect each of the two brake-application sections from an influence of the other brake-application section in the event of a failure of the other brake-application section. It is noted that the sealing member 127 may be fitted in a groove formed in the housing 104, or may be fitted in a groove formed in the control piston 108.

The control piston 106 partially defines a rear pressure chamber 128 formed on its rear side (its left side as seen in FIG. 1) remote from the control piston 108. The rear pressure chamber 128 is connected through a reservoir passage 130 to the reservoir 54. The reservoir passage 130 is provided with a reservoir communication valve 132 consisting of a solenoid operated valve that is of a normally closed valve placed in its closed state when an electric current is not supplied to the valve. This reservoir communication valve 132 is placed in its open state, as a principle, when the fluid pressures in the brake cylinders are controlled by controlling the pressure control cylinder 12. The rear pressure chamber 128 is also connected to the pressurizing chamber 36 of the master cylinder 10 through a by-pass fluid passage 134, which is provided with a stroke simulator 136 and a check valve 138 that are connected in series with each other. The check valve 138 permits flow of the fluid in a direction from the stroke simulator 136 toward the rear pressure chamber 128 but inhibits flow of the fluid in the reverse direction. With activation of the stroke simulator 136, the working fluid is supplied from the stroke simulator 136 to the rear pressure chamber 128.

A connecting passage 140 is provided to connect a portion of the passage 134 between the check valve 138 and the stroke simulator, to a portion of the passage 130 between the reservoir communication valve 132 and the reservoir 54. The connecting passage 140 is provided with a check valve 142, which permits flow of the fluid in a direction from the reservoir 54 toward the passage 134 but inhibits flow of the fluid in the reverse direction.

Between the stroke simulator 136 and the reservoir 54, a series connection of the check valve 138 and the reservoir communication valve 132 is positioned in parallel connection with the check valve 142. While the reservoir communication valve 132 is held in its open state, the working fluid can flow from the stoke simulator 136 toward the reservoir 54 through the check valve 138, and also can flow from the reservoir 54 toward the stroke simulator 136 through the check valve 142. That is, during the open state of the reservoir communication valve 132, the working fluid is permitted to flow between the stoke simulator 136 and the reservoir 54 in the opposite direction, whereby the stoke simulator 136 is placed in its operable state. In this sense, the reservoir communication valve 132 can be referred to as a simulator control valve.

Between the rear pressure chamber 128 and the reservoir, the reservoir communication valve 132 is positioned in parallel connection with a series connection of the check valves 142, 138. The fluid flow from the rear pressure chamber 128 toward the reservoir 54 is inhibited by the check valve 142, while the fluid flow from the rear pressure chamber 128 toward the stroke simulator 136 is inhibited by the check valve 138. In the present embodiment in which the reservoir communication valve 132 is placed in its closes state during the reverse displacement of the control piston 106, a working-fluid-flow inhibiting device is constituted principally by the check valves 142, 138 and the reservoir communication valve 132.

The reservoir communication valve 132 is placed in its open state, as a principle, when the fluid pressures in the brake cylinders are controlled by controlling the pressure control cylinder 12. With the reservoir communication valve 132 being placed in its open state, a volumetric change in the rear pressure chamber 128 is allowed whereby the control piston 106 is movable in the forward and reverse directions by the forward and reverse rotations of the pressure control motor 100. The motion converting device 102, serving to convert the rotary motion of the pressure control motor 100 into the linear motion of the drive shaft 117 with a high efficiency, may include a ballscrew-ballnut mechanism, for example. The reference signs 144 and 146 in FIG. 1 denote a thrust bearing and a radial bearing, respectively. These bearings receive axial and radial forces. The motion converting device 102 has a flange 148, which receives an axial force generated by the fluid pressure in the pressure controlling chamber 120.

The fluid passages 37, 39 are provided, at portions thereof downstream of the pressure control cylinder 12, with respective pairs of individual pressure-control valve devices 166, 168, which correspond to the respective front and rear pairs of wheel brake cylinders 14, 16. Each of the pressure control valve devices 160, 162 includes a pressure increasing valve 170 and a pressure reducing valve 172. The pressure increasing valve 170 is disposed between the pressure control cylinder 12 and the corresponding wheel brake cylinder 14, 16, while the pressure reducing valve 172 is disposed between the corresponding wheel brake cylinder 14, 16 and a reservoir 174. By controlling the four sets of the pressure increasing and reducing valves 170, 172, the fluid pressures in the corresponding four brake cylinders 14, 16 of the front and rear wheels 18, 20 can be controlled independently of each other. A by-pass passage, which by-passes each of the pressure increasing valves 170, is provided with a check valve 173 which permits flow of the fluid in a direction from the corresponding brake cylinder toward the master cylinder 10 but inhibits flow of the fluid in the reverse direction, so that the working fluid can be rapidly returned from the brake cylinders 14, 16 toward the master cylinder 10 upon releasing of the brake operating member 34. The present braking system is capable of effecting an anti-lock braking pressure control for each wheel 18, 20 by controlling the individual pressure-control valve device 166, 168, such that the state of slipping of each wheel 18, 20 on the road surface is controlled to be held within an optimum range depending upon the friction coefficient of the road surface, as well known in the art.

Each of two pump passages 180 is connected, at its one end to the corresponding one of the two reservoirs 174, and at its other end to a portion of the fluid passage 37, 39 which is located between the pressure increasing valves 170 and the pressure control cylinder 12. The pump passage 180 is provided with a pump 182, two check valves 184, 186 and a damper 188. The two pumps 182 connected to the respective two reservoirs 174 are driven by a common pump motor 190.

Figure 2:
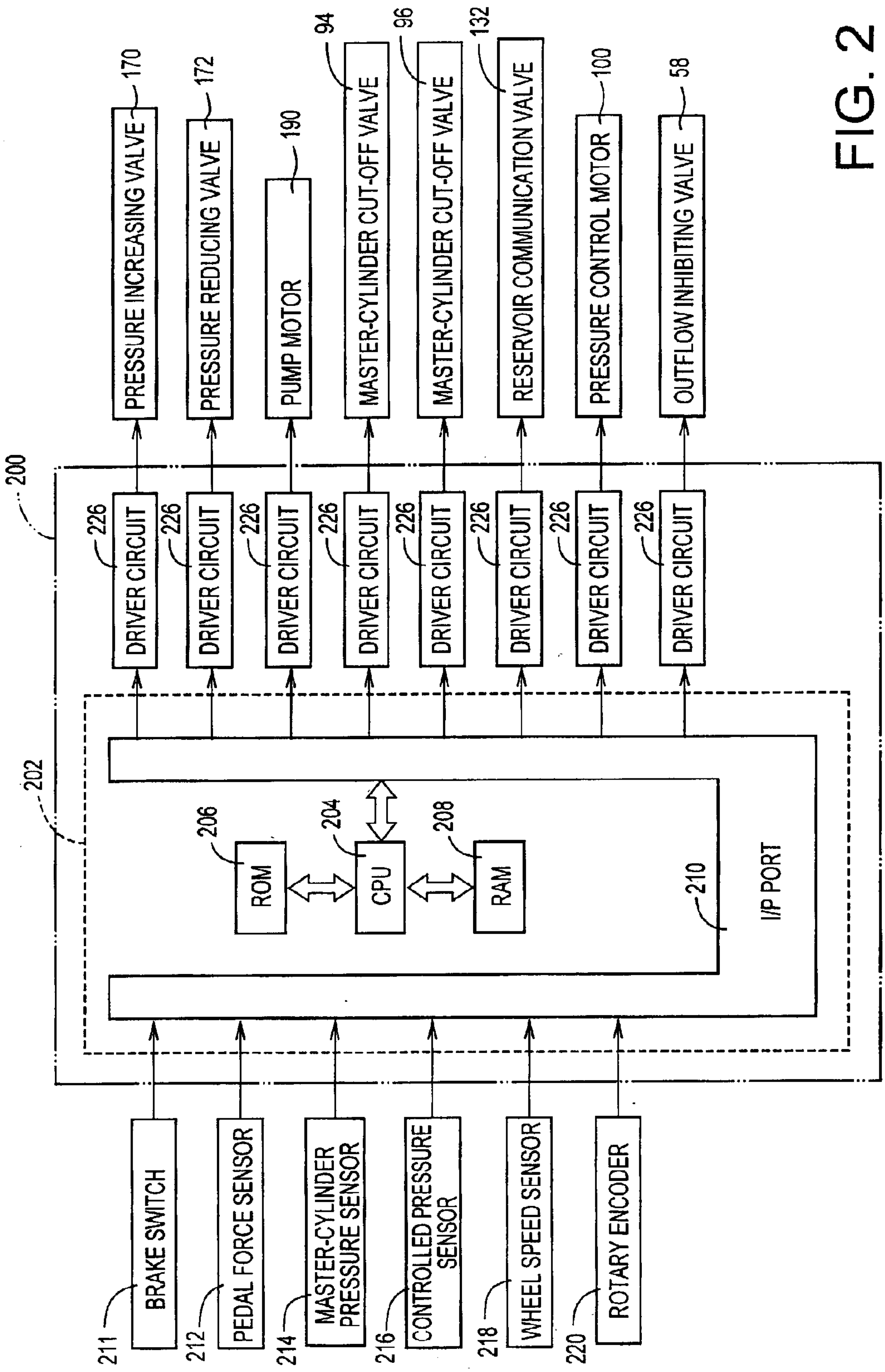
FIG. 2 is a block diagram showing a braking-pressure control device included in the braking system of FIG. 1.

The present braking system is provided with an electronic braking control unit (ECU) 200, which is arranged as shown in FIG. 2. The ECU 200 includes a control portion 202 principally constituted by a computer, and a plurality of driver circuits 226. The control portion 202 incorporates a central processing unit (CPU) 204, a read-only memory (ROM) 206, a random-access memory (RAM) 208, and an input-output portion 210. To the input-output portion 210, there are connected: a brake switch 211 for detecting an operation of the brake pedal 34; a pedal force sensor 212 for detecting the operating force acting on the brake pedal 34; a master-cylinder pressure sensor 214 for detecting the fluid pressure in the pressurizing chamber 38 of the master cylinder 10; a controlled pressure sensor 216 for detecting the fluid pressure in the pressure controlling chamber 120 of the pressure control cylinder 12; wheel speed sensors 218 for detecting rotating speeds of the respective wheels 18, 20; and a rotary encoders 220 for detecting an angle of rotation of the pressure control motor 100.

The master-cylinder pressure sensor 214 is connected to the fluid passage 39 connected to the pressurizing chamber 38. The pressure sensor 216 detects the fluid pressure in the pressure controlling chamber 120, which is substantially equal to the fluid pressure in the pressure controlling chamber 122. Further, the fluid pressure detected by the pressure sensor 216 represents the fluid pressure in each of the brake cylinders 14, 16 when the individual pressure-control valve devices 160, 162 are placed in their original positions of FIG. 1. This means that the pressure sensor 216 serves as a brake pressure sensor for detecting the braking pressure in each of the brake cylinders 14, 16. The rotary encoder 220 serves as a piston-position sensor for detecting a current position of the control piston 106 relative to the housing 104, namely, a distance from the rear stroke end position to the current position of the control piston 106, or distance from the current position of the control piston 106 to the front stroke end position.

To the input-output portion 210, there are also connected through respective driver circuits 226 the solenoid coils of the pressure increasing valves 170, pressure reducing valves 172, master-cylinder cut-off valves 94, 96, outflow inhibiting valve 58 and reservoir communication valve 132, and the pump motor 190 and pressure control motor 100. The ROM 206 stores various control programs such as a program for executing a braking control routine illustrated in the flow chart of FIG. 3, a program for executing a piston-bottoming-state detecting routine illustrated in the flow chart of FIG. 4 and a program for executing an anti-lock braking pressure control routine (not shown). The ROM 206 stores also various data tables (not shown) serving in determining a desired level of the braking pressure.

There will be described an operation of the present braking system. As the brake pedal 34 is depressed, the pressurizing pistons 30, 32 are advanced whereby the working fluid is supplied from the master cylinder 10 to the brake cylinders 14, 16. In this instance, since the outflow inhibiting valve 58 is held in its closed state, the working fluid is delivered to the fluid passage 39 from not only the pressurizing chamber 38 but also the annular chamber 46 in which the working fluid is pressurized by the large-diameter portion 44 of the piston 30. Thus, it is possible to supply the working fluid to the brake cylinders at a comparatively high rate, and accordingly to complete the fast filling in a relatively short time.

When the fluid pressure in each of the brake cylinders 14, 16 has been increased to the predetermined threshold value, the outflow inhibiting valve 58, the master-cylinder cut-off valves 94, 96 and the reservoir communication valve 132 are energized, so that the valves 58, 132 are placed in their open states, while at the same time the valves 94, 96 are switched in their closed states. While the brake cylinders 14, 16 are thus disconnected form the mater cylinder 10, the fluid pressures in the brake cylinders 14, 16 (hereinafter referred to as "braking pressure" where appropriate) are controlled, by controlling the pressure control cylinder 12 according to the operating state of the brake pedal 34. The control piston 106 receives a drive force corresponding to a drive torque of the pressure control motor 100, and the fluid pressure in the pressuring control chambers 120, 122 is controlled to a level proportional to the drive force acting on the control piston 106. In other words, the drive force of the control piston 106, i.e., an amount of the electric current supplied to the pressure control motor 100 is controlled such that an actually detected value of the braking pressure or deceleration rate coincides with a desired value of the braking pressure or deceleration which is determined on the basis of the operating state of the brake pedal 34.

In the present embodiment, the desired value of the braking pressure is determined on the basis of the operating force of the brake pedal 34 which is detected by the pedal force sensor 212, so that the electric current supplied to the pressure control motor 100 is controlled such that the actual value of the braking pressure detected by the pressure sensor 216 coincides with the desired value of the braking pressure. On the basis of a difference between the actual and desired values, a pressure control mode of the braking system is determined. When the actual value is smaller than the desired value, the braking system is placed in a pressure increase mode in which the drive force acting on the control piston 106 is increased. When the actual value is larger than the desired value, the braking system is placed in a pressure decrease mode in which the drive force of the control piston 106 is reduced. When the actual value is substantially equal to the desired value, the braking system is placed in a pressure hold mode in which the pressure control motor 100 is supplied with a predetermined amount of the electric current suitable for holding the braking pressure unchanged. It is noted that, in the pressure hold mode, it is possible to switch the reservoir communication valve 132 from its open state to its closed state, in stead of keeping the supply of the electric current to the pressure control motor 100. With the reservoir communication valve 132 being placed in its closed state, the working fluid is inhibited from being discharged from the rear pressure chamber 128, so that the reverse displacement of the control piston 106 is inhibited whereby the fluid pressure in the pressure controlling chambers 120, 122 can be maintained even after the amount of electric current to be applied to the pressure control motor 100 is zeroed.

Since the outflow inhibiting valve 58 is placed in its open state after completion of the fast filling, the working fluid in the annular chamber 46 is discharged to the reservoir 54 with the forward displacement of the pressurizing piston 30, so that the working fluid is pressurized by the small-diameter portion 42 of the piston 30 in the pressurizing chamber 38. Further, since the reservoir communication valve 132 is placed in its open state, the stroke simulator 136 is placed in its operable state. A reaction force applied to the brake pedal 34 is increased with an increase of the operating stroke of the brake pedal 34. During the activation of the stroke simulator 136, since the outflow inhibiting valve 58 is held in its open state, the working fluid is pressurized always by the small-diameter portion 42, thereby avoiding a change in characteristic of the reaction force applied to the brake pedal 34 during the control of the fluid pressure by means of the pressure control cylinder 12.

When the brake pedal 34 is released, each of the magnetically operated valves is de-energized to restore to its original state of FIG. 1. The working fluid is returned from the brake cylinders 14, 16 to the master cylinder 10 via the pressure controlling chambers 120, 122. The working fluid in the rear pressure chamber 128 is supplied to the pressure controlling chamber 120 through the annular cup seal 109 as a result of the reverse displacement of the control piston 106, so that the working fluid is returned to the master cylinder 10.

The electronic braking control unit 200 includes a piston-bottoming-state detecting portion which is assigned to detect a piston-bottoming state in which the control piston 106 or 108 of the pressure control cylinder 12 has almost reached in its front stroke end position, or a possibility of occurrence of the piston-bottoming state. If the piston-bottoming state or the possibility of its occurrence is detected, the control piston 106 is first displaced in the reverse direction and is then displaced in the forward direction by the activation of the pressure control motor 100. This reciprocating motion of the control piston 106 permits a larger amount of the working fluid to be supplied to the brake cylinders, thereby preventing an insufficient increase in the braking pressure which would be caused by a deficiency of the working fluid. Thus, the pressure control cylinder 12 functions as a pump in the event of the detection of the piston-bottoming state or the possibility of its occurrence.

A shortage of the working fluid due to a fluid leakage makes it difficult to sufficiently increase the braking pressure. In such an abnormal state, the operating force applied to the brake pedal 34 by the vehicle operator is extremely increased in such an extent that would cause the piston-bottoming state. Further, a considerable increase in a braking clearance in each of the brakes 22, 24 causes an excessive increase in a ratio of a distance from the rear stroke end position to a position of the control piston 106 with respect to the braking pressure, or causes an excessive reduction in a ratio of the braking pressure with respect to the distance from the rear stroke end position to the position of the control piston 106, thereby possibly causing the piston-bottoming state.

While the distance of the displacement of the control piston 106 or the braking pressure is relatively small, it is possible to assume that there is a possibility of future occurrence of the piston-bottoming state, if the ratio of the displacement distance to the braking pressure is excessively large, or if the ratio of the braking pressure to the displacement distance is excessively small. In this case, if the control piston 106 is further displaced in the forward direction, it is possible to determine that the piston-bottoming state will be occurred.

In the graph of FIG. 7, the broken line represents the relationship between the braking pressure and the position of the displaced control piston 106 in a normal state of the braking system, while the solid line located above the broken line represents the relationship between the braking pressure and the position of the displaced control piston 106 in the event of deficiency of the working fluid. Where the relationship lies below a permissible limit line that is represented by the chain line, it is determined that the reciprocating motion of the control piston 106 is not required. As is clear from this graph, the ratio of the displacement distance of the control piston 106 to the braking pressure is made larger in the event of deficiency of the working fluid, than in the normal state. In view of this fact, it is determined in the present embodiment that there is a possibility of occurrence of the piston-bottoming state in the following two cases:

(a) where the displacement distance is larger than a predetermined value $S_{K0}$ while the fluid pressure in the pressure controlling chambers 120, 122 (corresponding to the braking pressure) is smaller than a predetermined small value, namely, where the control piston 106 has been displaced forwardly from the rear stroke end position by a certain distance although the braking pressure is almost zero and accordingly smaller than a predetermined value $\beta_1$; and (b) where the displacement distance is larger than a predetermined value $S_{K1}$ while the fluid pressure is larger than the above predetermined value $\beta_1$ but smaller than a predetermined value $P_{W1}$.

The above-described predetermined value $P_{W1}$ is a minimum value of the braking pressure when the displacement distance of the control piston 106 is larger than the above-described predetermined value $S_{K1}$. In other words, the predetermined value $P_{W1}$ is determined such that the braking pressure can not be smaller than predetermined value $P_{W1}$ even in the event of occurrence of a vapor lock as long as the displacement distance is larger than the above-described predetermined value $S_{K1}$.

Further, it is possible to determine that the pressure control cylinder 12 is actually placed in the piston-bottoming state, where the braking pressure is not increased to a required level although the control piston 106 is positioned near to the rear stroke end position. In the present embodiment, it is determined that the piston-bottoming state is actually occurred in the following case:

(c) where the displacement distance is not smaller than a predetermined value $\beta_2$ that is close to a value of distance between the front and rear stroke end positions, while the braking pressure is smaller than a predetermined value or level $P_{BK}$.

That is, in the present embodiment, the pressure-control cylinder 12 is controlled to function as a pump in each of the above-described cases (a), (b), (c), so that the control piston is displaced in the reverse direction and then displaced in the forward direction. During the reverse displacement of the control piston 106, the reservoir communication valve 132 is placed in its closed state, so that the fluid pressure in the rear pressure chamber 128 is increased with a reduction in the volume of the rear pressure chamber 128 as a result of the reverse displacement of the control piston 106. In this instance, the increase in the fluid pressure in the rear pressure chamber 128 induces flow of the working fluid from the rear pressure chamber 128 to the pressure controlling chamber 120 through the annular cup seal 109. During the forward displacement which follows the reverse displacement, the reservoir communication valve 132 is placed in its open state, so that the working fluid is supplied to the rear pressure chamber 128 from the reservoir 54 via the check valves 138, 142 or/and via the reservoir communication valve 132 placed in the open state, as the volume of the rear pressure chamber 128 is increased as a result of the forward displacement of the control piston 106. In the reciprocating motion of the control piston 106, the rear pressure chamber 128 functions as a pump chamber. Each of the check valves 138, 142 serves as an inlet valve, while the annular cup seal 109 serves as an outlet valve.

In each of the above-described cases (a), (b), the control piston 106 is displaced in the reverse direction by a target value dS* of distance, which is determined according to the following equation (1):

$$dS^* = dSi \cdot Ac_1/(Ac_1 - Ac_2) \quad (1)$$

wherein "dSi" represents a deviation "$dS_0$" or "$dS_1$" from the permissible limit line represented by the chain line in the graph of FIG. 7; "$Ac_1$" represents an area of a front pressure-receiving surface of the control piston 106 which partially defines the pressure-receiving chamber 120; "$Ac_2$" represents a transverse cross section of the piston rod 118; and "$(Ac_1-Ac_2)$" represents an area of a rear pressure-receiving surface of the control piston 106 which partially defines the rear pressure chamber 128.

Figure 8:
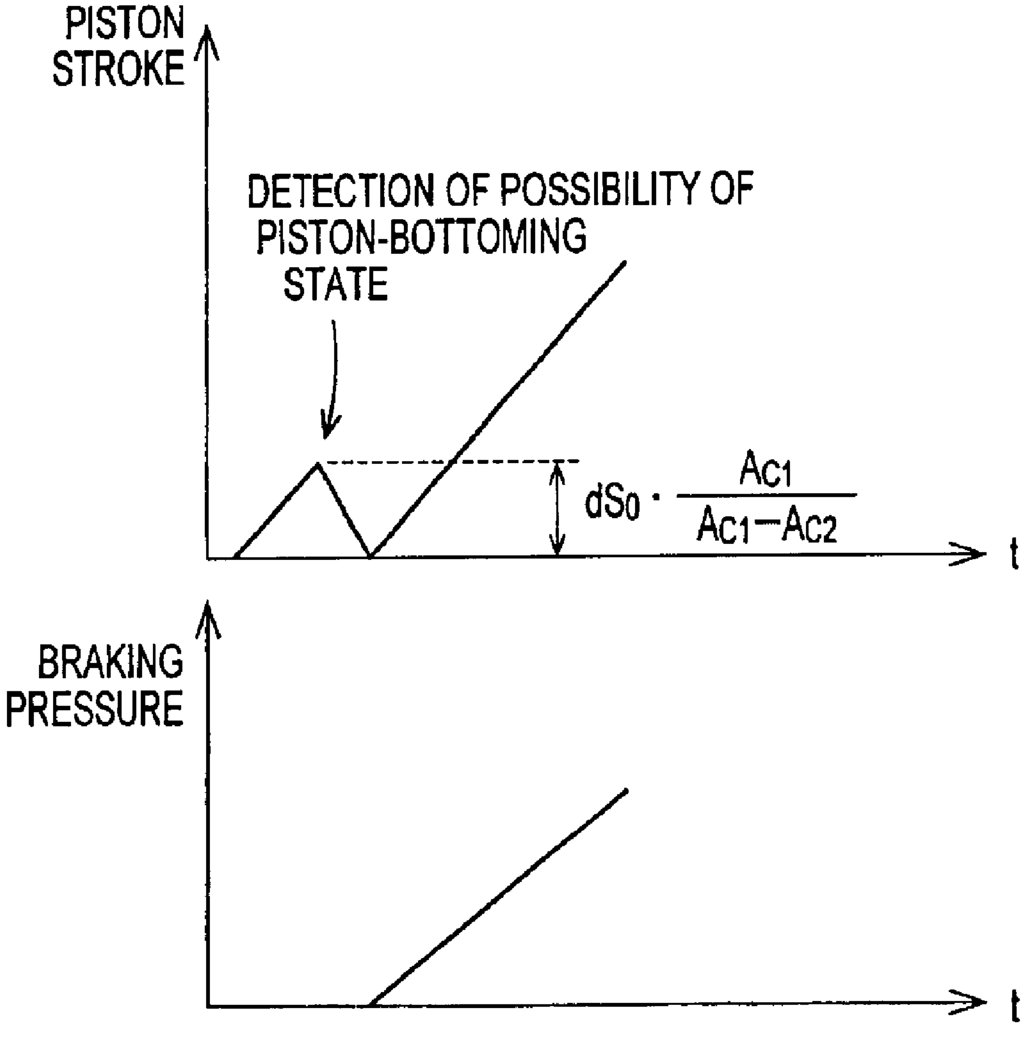
FIG. 8 is a graph indicating an example of a control operation of the braking-pressure control device.

After the control piston 106 has been displaced in the reverse direction by the target value dS* of distance, the pressure control cylinder 12 is subjected to the normal brake control in which the pressure control motor 100 is controlled such that an actual value of the braking pressure is substantially equalized to a value desired by the vehicle operator. In this case, immediately after the reverse displacement, the control piston 106 is displaced in the forward direction for increasing the braking pressure. By the reverse and forward displacements of the control piston 106, the braking pressure and the piston position are changed as shown in FIG. 8. In the case (a), the actual value of braking pressure remains zero until the control piston 106 is displaced in the forward direction after the reverse displacement by the target value dS* of distance [$=dS_0 \cdot Ac_1/(Ac_1-Ac_2)$].

In the case (c) in which the control piston 106 has reached almost in the front stroke end position while the braking pressure has not reached a level desired by the vehicle operator, the control piston 106 is reversed and then advanced for increasing the actual value of braking pressure to a predetermined level $P_{BK}$. In this case, the distance of the reverse displacement is determined such that the actual value of braking pressure reaches the predetermined level $P_{BK}$ when one reciprocating motion of the control piston is completed. In the present embodiment, a pressure reduction value $dP_{BW}$ (by which the actual value $P_W$ of braking pressure is to be reduced as a result of the reverse displacement of the control piston 106) is determined according to the following equation (2):

$$dP_{BW} = dP_B \cdot Ac_2/(Ac_1 - Ac_2) \quad (2)$$

wherein "$dP_B$" represents a deviation from the predetermined level $P_{BK}$ of the braking pressure to the actual value $P_W$.

Figure 9:
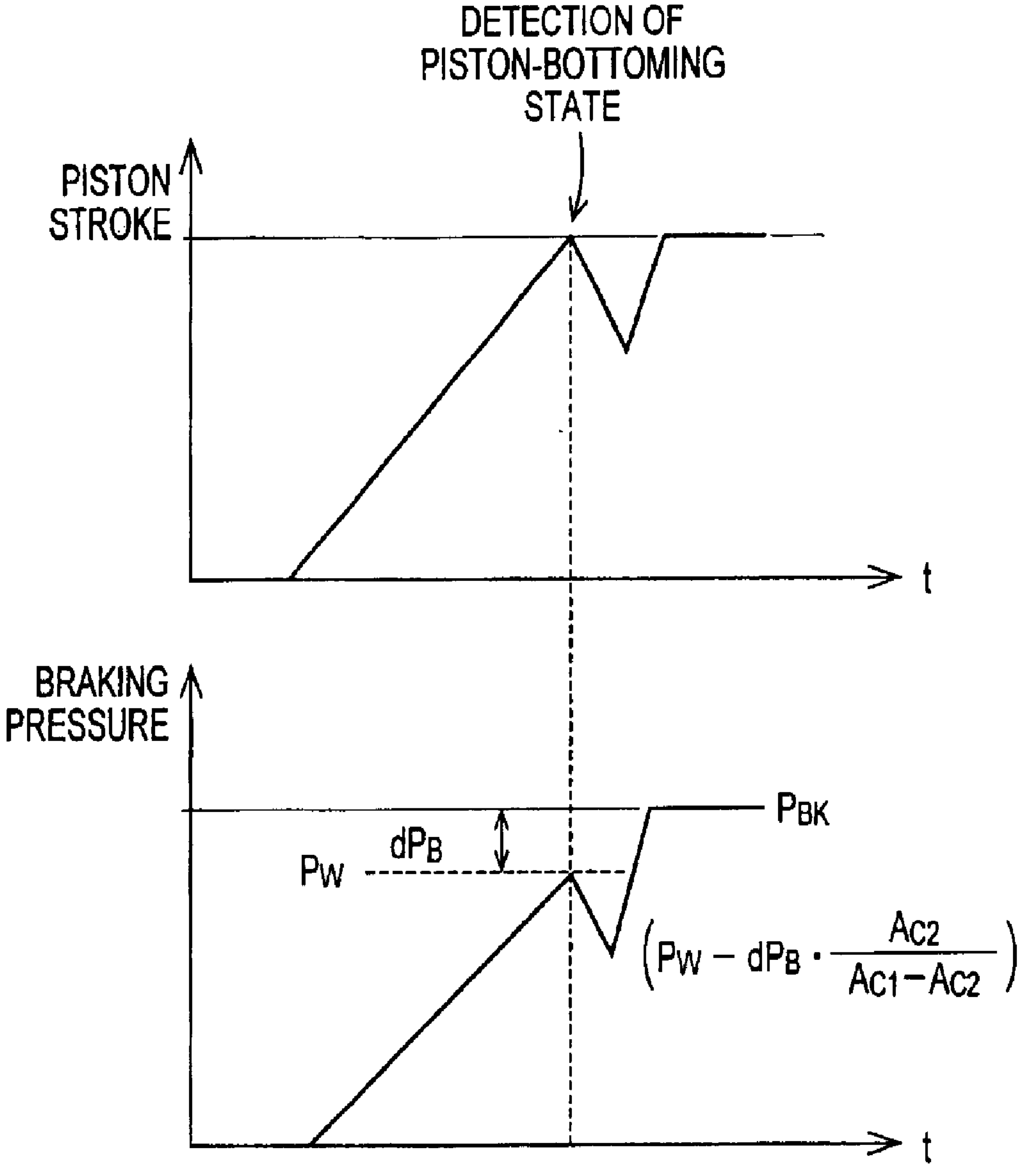
FIG. 9 is a graph indicating an example of a control operation of the braking-pressure control device.

The fluid pressure in the pressure controlling chamber 120 is reduced with an increase in the volume of the chamber 120 as a result of the reverse displacement of the control piston 106. The working fluid is then supplied from the rear pressure chamber 128 to the pressure controlling chamber 120. In view of this, the control piston 106 requires to be displaced in the reverse direction until the actual value $P_W$ has been reduced by the above-described pressure reduction value $dP_{BW}$, so that the actual value $P_W$ of braking pressure reaches the predetermined level $P_{BK}$ when one reciprocating motion of the control piston 106 is completed. A target value $P_W^*$ of braking pressure (at the point of time at which the reverse displacement of the control piston 106 is completed) is expressed in the following equation (3):

$$P_W^* = P_W - dP_{BW} \quad (3)$$

wherein "$P_W$" represents the actual value of braking pressure at the point of time at which the reverse displacement of the control piston 106 is initiated. As shown in FIG. 9, the braking pressure can be increased to the predetermined level $P_{BK}$, when the control piston 106 has been advanced after being reversed until the actual value $P_W$ of braking pressure coincides with the target value $P_W^*$ of braking pressure.

Where the piston-bottoming state or the possibility of its occurrence has been detected in the last control cycle, the threshold value of braking pressure, at which the fast filling is considered to be completed, is increased. That is, when the piston-bottoming state has been detected due to satisfaction of the above-described condition or case (c), the threshold value of braking pressure, at which the outflow inhibiting valve 58 is switched from its closed state to its open state, is determined on the basis of a relationship between a piston position and a fluid pressure value upon the detection of the piston-bottoming state and also a referential or target relationship stored in the ROM 206 of the ECU 200. The threshold value is increased by a larger amount where a deviation of the actual relationship from the target relationship is relatively large, than where the deviation is relatively small. Namely, the threshold value is increased by a larger amount where the degree of deficiency of the braking pressure is relatively large, than where the degree of deficiency is relatively small. Accordingly, the amount of the working fluid to be supplied to the brake cylinders during the fast filling is increased with an increase in the amount of deficiency of the braking pressure. Owing to this arrangement, it is possible to reduce the shortage of the working fluid and to accordingly reduce the possibility of occurrence of the piston-bottoming state in the next brake control cycle.

It is noted that it is possible to somewhat increase the above-described threshold value of braking pressure (at which the fast filling is considered to be completed), even where the where the piston-bottoming state or the possibility of its occurrence has not been detected. That is, the threshold value of braking pressure may be increased on the basis of an amount of the deviation of the actual relationship from the target relationship, as long as there exists the deviation.

It is also noted that the piston position and the fluid pressure value upon the detection of the piston-bottoming state do not have to be necessarily taken account in determining the threshold value of braking pressure. For example, the threshold value may be made larger simply by a predetermined amount where the piston-bottoming state is detected, than where the piston-bottoming state is not detected. Further, also where the above-described condition (a) or (b) is detected, it is possible to increase the threshold value of braking pressure on the basis of the piston position and the fluid pressure value upon the satisfaction of the condition (a) or (b), or increase the threshold value of braking pressure by a predetermined amount.

The present braking system has also provision for detecting a failure of each of the two brake-application sections. In the event of a failure of the brake-application section for braking the front right and left wheels 18, 18, the failure can be easily detected on the basis of an output of the pressure sensor 216. It can be determined that the front brake-application section is out of order, for example, where an actual value of the fluid pressure detected by the pressure sensor 216 is not larger than a predetermined value while the amount of electric current supplied to the pressure control motor 100 is not smaller than a predetermined value. As to a failure of the brake-application section (in which the pressure section 216 is not provided) for braking the rear right and left wheel 20, 20, it can be determined that the rear brake-application section is out of order, for example, in the following case (d):

(d) where two conditions (d-1), (d-2) are satisfied while the actual value of the fluid pressure detected by the pressure sensor 216 is larger than a predetermined value $\alpha_3$ that is considered to be somewhat large, wherein one (d-1) of the two conditions is that the actual position of the control piston detected by the rotary encoder 220 is distant from the rear stroke end position by at least a predetermined value $\alpha_1$ which corresponds to about 70% of the distance between the front and rear stroke end positions, and wherein the other (d-2) of the two conditions is that a ratio of an increase in the distance from the rear stroke end position to the piston position with respect to an increase in the braking pressure is not smaller than a predetermined value $\alpha_2$ which is larger than a value in a normal case and is smaller than a value in the event of a failure of the front brake-application section.

Figure 3:
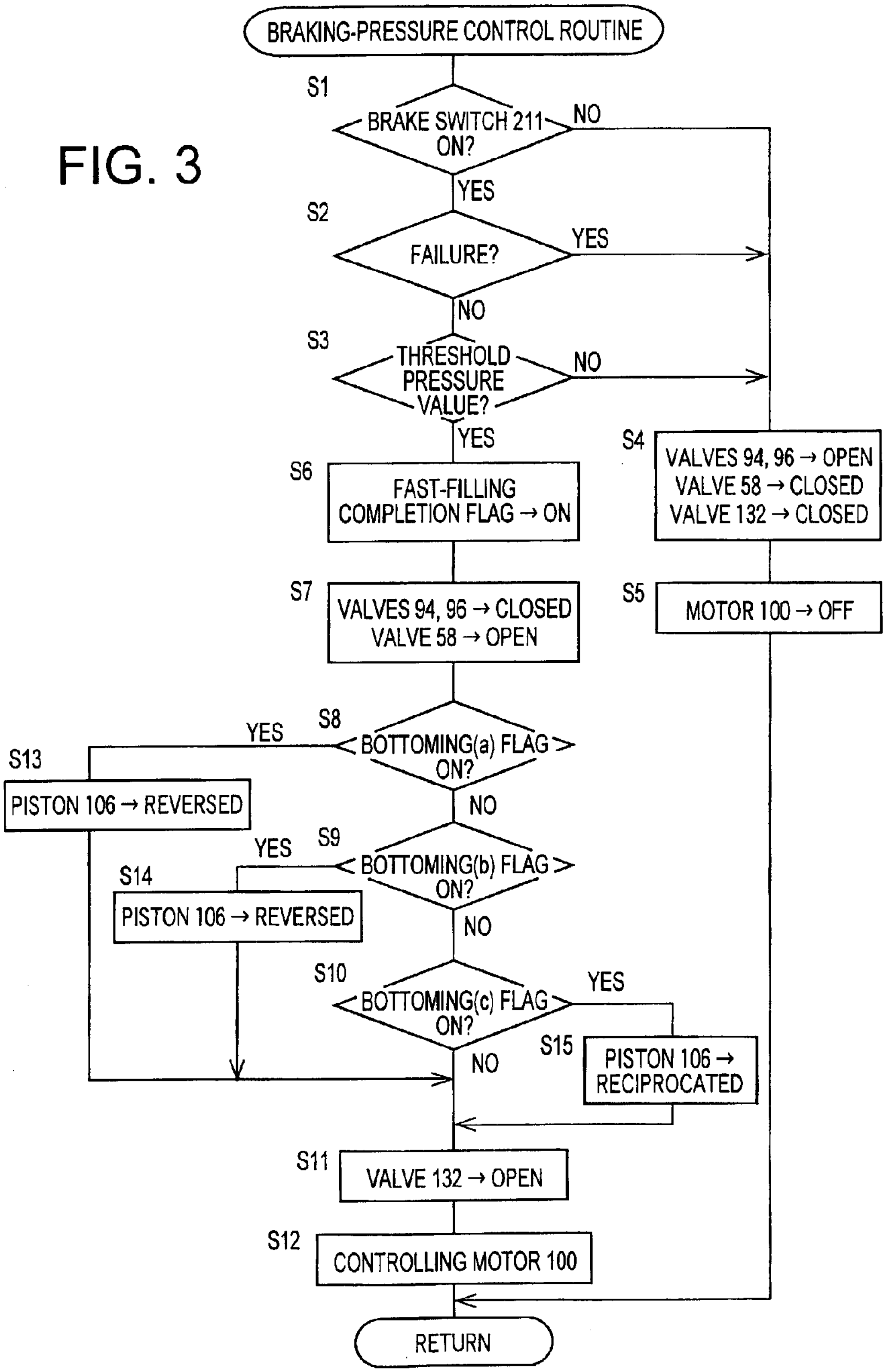
FIG. 3 is a flow chart illustrating a braking-pressure control routine executed according to a control program stored in a ROM of the braking-pressure control device of FIG. 2.

In the braking system of the present embodiment, the braking pressure is controlled by execution of a braking-pressure control routine illustrated in the flow chart of FIG. 3. This routine is initiated with step S1 to determine whether the brake pedal 34 is in operation, that is, whether the brake switch 211 is in an ON state. If an affirmative decision (YES) is obtained in step S1, the control flow goes to step S2 to determine whether a failure of at least one of the two brake-application sections has been detected. A negative decision (NO) in step S2 is followed by step S3 to determine whether the fluid pressure detected by the pressure sensor 216 has increased to a predetermined value. Unless an affirmative decision is obtained in step S3, the braking pressure is not controlled by controlling the pressure control cylinder 12. A negative decision in step S1, a positive decision in step S2 or a negative decision in step S3 is followed by steps S4, S5 in which the master-cylinder cut-off valves 94, 96, outflow inhibiting valve 58 and reservoir communication valve 132 are placed in their original positions as shown in FIG. 1 while the pressure control motor 100 is placed in its non-operated state. The working fluid in the pressurizing chambers 36, 38 is pressurized according to an operation of the brake pedal 34, so that the pressurized fluid is supplied to the brake cylinders 14, 16 for braking the wheels 18, 20. In this instance, the working fluid is supplied from the annular chamber 46 as well as from the pressurizing chambers 36, 38. It should be noted that the fluid pressure in the annular chamber 46 is prevented by the relief valve 56 from being increased to be larger than a relief pressure of the relief valve 56, for permitting the brake pedal 34 to be displaceable in the forward direction, even if the outflow inhibiting valve 58 is held in its closed state due to a failure in supply of the electric current to the valve 58.

If the positive decision is obtained in step S3, the control flow goes to step S6 in which a fast-filling completion flag is set to ON. In the subsequent step S7, the outflow inhibiting valve 58 is switched to its open state while the master-cylinder cut-off valves 94, 96 are switched to their closed states. The fast-filling completion flag is reset to OFF, each time one cycle of execution of the routine is terminated. Step S7 is followed by steps S8–S10 in each of which it is determined whether the piston-bottoming state or the possibility of its occurrence has been detected. The determination in each of steps S8–S10 is made by seeing whether a corresponding one of the below-described flags is ON or not.

Where neither the piston-bottoming state nor the possibility of its occurrence has been detected, the control flow goes to steps S11, S12 in which the present braking system is subjected to the normal brake control. Specifically, in step S11, the reservoir communication valve 132 is placed in its open state. Step S12 is then implemented to start controlling the electric current supplied to pressure control motor 100 such that an actual value of the braking pressure is substantially equalized to a value desired by the vehicle operator. On the other hand, where the piston-bottoming state or the possibility of its occurrence has been detected, the control flow goes to step S13, S14 or S15. That is, where it is determined that there is a possibility or high possibility of occurrence of the piston-bottoming state as a result of satisfaction of the above-described condition (a) or (b), step S13 or S14 is implemented to reverse the control piston 106, and then steps S11, S12 are implemented to control the braking pressure in the normal brake control. Where it is determined that the piston-bottoming state has been detected due to satisfaction of the above-described condition (c), step S15 is implemented to reciprocate the control piston 106, and then steps S11, S12 are implemented to carry out the normal brake control.

Figure 4:
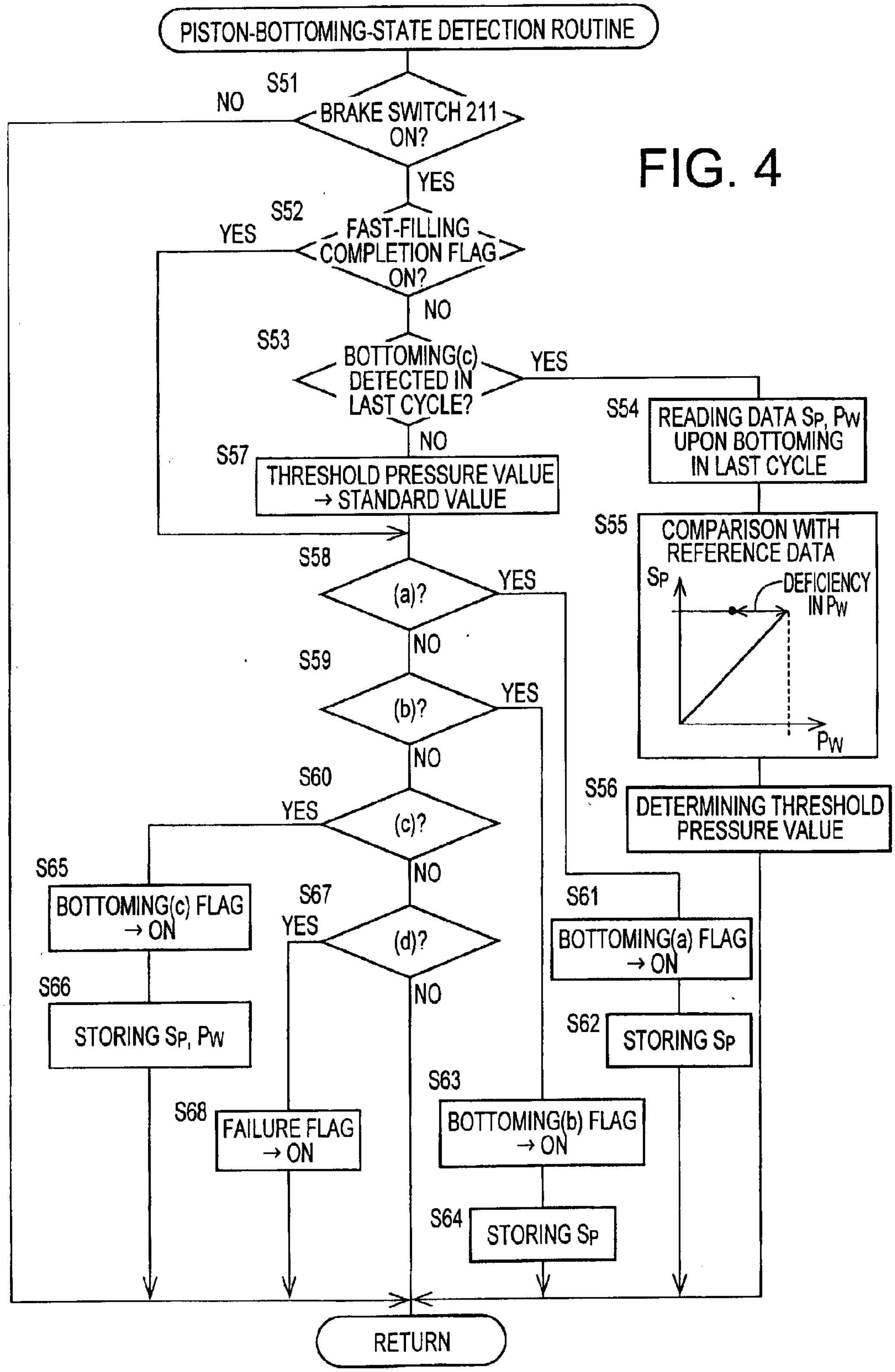
FIG. 4 is a flow chart illustrating a piston-bottoming-state detecting routine according to a control program stored in a ROM of the braking-pressure control device of FIG. 2.

The detection of the piston-bottoming state or the possibility of its occurrence is made by executing the piston-bottoming-state detecting routine illustrated in the flow chart of FIG. 4. This routine is initiated with step S51 to determine whether the brake switch 211 is in its ON state. If an affirmative decision is obtained in step S51, the control flow goes to step S52 to determine whether the above-described fast-filling completion flag is ON. If the fast filling has not been completed, namely, if a negative decision is obtained in step S52, step S53 is implemented to determine whether an affirmative decision has been obtained in step S10 in the last brake control cycle. That is, in step S53, it is determined whether "BOTTOMING (c)" has been detected by satisfaction of the above-described condition (c) in the last brake control cycle. Where the "BOTTOMING (c)" has been detected in the last brake control cycle, steps S54–56 are implemented to determine the threshold value of braking pressure on the basis of the relationship between the piston position and the fluid pressure value upon the detection of the piston-bottoming state and also the referential or target relationship stored in the ROM 206 of the ECU 200. Where the "BOTTOMING (c)" has not been detected in the last brake control cycle, the threshold value of braking pressure is set in a standard value in step S57.

Step S57 is followed by steps S58–S60 in which it is determined whether each of the above-described conditions (a), (b), (c) is satisfied. These three conditions (a), (b), (c) can not be satisfied concurrently with each other. If it is determined in step S58 that the condition (a) is satisfied, the control flow goes to step S61 to set a BOTTOMING (a) flag to ON. In the subsequent step S62, data indicative of a piston position or stroke Sp upon the satisfaction of the condition (a) are stored in the RAM 208 of the control portion 202 of the ECU 200. If it is determined in step S59 that the condition (b) is satisfied, the control flow goes to step S63 to set a BOTTOMING (b) flag to ON. In the subsequent step S64, data indicative of a piston position or stroke Sp upon the satisfaction of the condition (b) are stored in the RAM 208. If it is determined in step S60 that the condition (c) is satisfied, the control flow goes to step S65 to set a BOTTOMING (c) flag to ON. In the subsequent step S66, data indicative of a piston position or stroke Sp and a braking pressure Pw upon the satisfaction of the condition (c) are stored in the RAM 208. If a positive decision is not obtained in any one of steps S58–S60, the control flows goes to step S67 to determine whether the above-described condition (d) is satisfied. A positive decision in step S67 is followed by step S68 in which a failure flag is set to ON.

Figure 5:
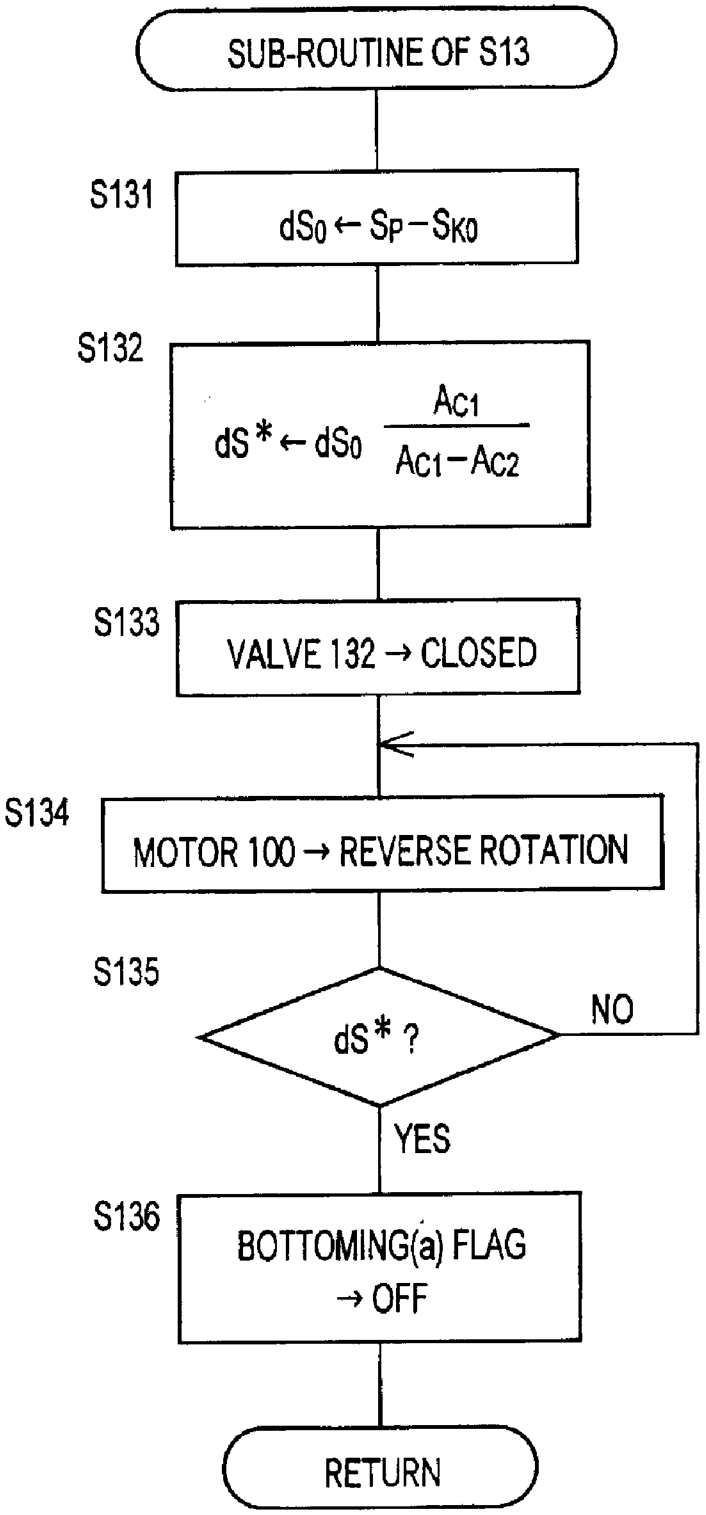
FIG. 5 is a flow chart illustrating a part of the braking-pressure control routine of FIG. 3.

A positive decision is obtained in step S8 while the BOTTOMING (a) flag is ON, whereby step S13 is implemented to displace the control piston 106 in the reverse direction. Step S13 has a sub-routine illustrated in the flow chart of FIG. 5. This sub-routine is initiated with step S131 to calculate an amount of the above-described deviation $dS_0$ as an excessive stroke amount or excessive displacement amount, by subtracting a permissible amount $S_{K0}$ (lying on the permissible limit line as shown in the graph of FIG. 7) from an amount of the piston stroke Sp upon the satisfaction of the condition (a). In step S132, the target value dS* of reversing distance is determined according to the above-described equation (1) on the basis of the excessive displacement amount $dS_0$ which was calculated in step S131. Step S132 is followed by steps S133, S134 in which the reservoir communication valve 132 is switched to its closed state, and the pressure control motor 100 is rotated in the reverse direction. In step S135, it is determined whether the control piston 106 has been displaced in the reverse direction by the target value dS* of distance. If a negative decision is obtained in step S135, the pressure control motor 100 is kept to be rotated in the reverse direction for further displacing the control piston 106 in the reverse direction. When the control piston 106 has been reversed by the target value dS* of distance, the BOTTOMING (a) flag is reset to OFF in step S136, whereby one execution of the sub-routine of step S13 is terminated so that the control flow goes to steps S11, S12. Since the braking pressure has been reduced as a result of the reveres displacement of the control piston 106, the pressure control motor 100 is rotated in the forward direction for increasing an actual value of the fluid pressure in the pressure controlling chamber 120 to a value desired by the vehicle operator.

A positive decision is obtained in step S9 while the BOTTOMING (b) flag is ON, whereby step S14 is implemented to displace the control piston 106 in the reverse direction. Step S14 has a sub-routine, which is identical with the above-described sub-routine of step S13 except that the target value dS* of reversing distance is determined on the basis of an amount of the above-described deviation $dS_1$, rather than on the basis of the amount of the deviation $dS_0$. The amount of the deviation $dS_1$ is calculated by subtracting a permissible amount $S_{K1}$ from an amount of the piston stroke Sp upon the satisfaction of the condition (b) (see the graph of FIG. 7).

Figure 6:
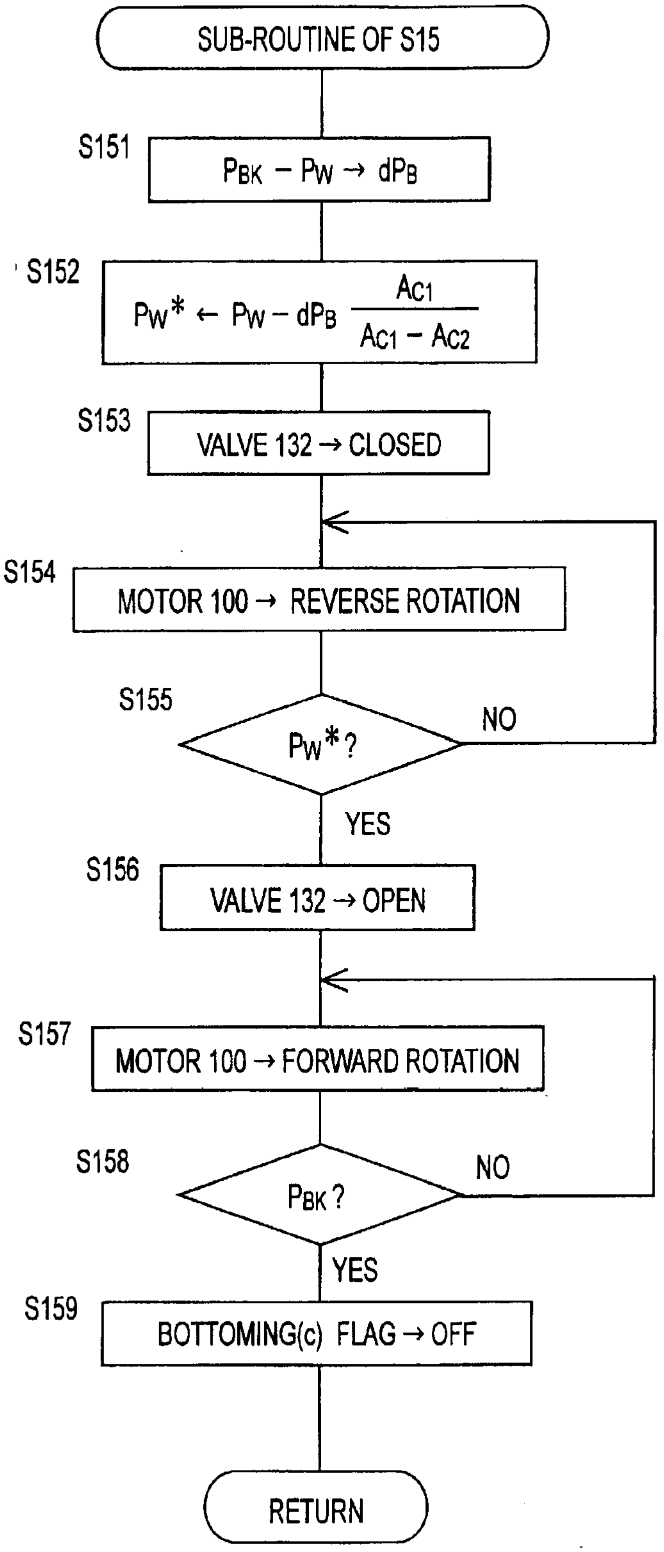
FIG. 6 is a flow chart illustrating a part of the braking-pressure control routine of FIG. 3.

A positive decision is obtained in step S10 while the BOTTOMING (c) flag is ON, whereby step S15 is implemented to reciprocate the control piston 106. Step S15 has a sub-routine illustrated in the flow chart of FIG. 6. This sub-routine is initiated with step S151 to calculate an amount of the above-described deviation $dP_B$ as a deficient pressure amount, by subtracting the permissible level $P_{BK}$ (lying on the permissible limit line as shown in the graph of FIG. 7) from an amount of the braking pressure $P_W$ upon the satisfaction of the condition (c). In step S152, a target value $P_W$* of braking pressure, to which the braking pressure is to be reduced when the control piston 106 has been displaced in the reverse direction, is determined. Step S152 is followed by steps S153, S154 in which the reservoir communication valve 132 is switched to its closed state while the pressure control motor 100 is rotated in the reverse direction. In step S155, it is determined whether the braking pressure has been reduced to the target value $P_W$* or not. If a positive decision is obtained in step S155, steps S156–S158 are implemented to displace the control piston 106 in the forward direction. In step S156, the reservoir communication valve 132 is switched to its open state. In step S157, the pressure control motor 100 is rotated in the forward direction. In step S158, it is determined whether the braking pressure has been increased to the permissible level $P_{BK}$. The control piston 106 is kept to be advanced until a positive decision is obtained in step S158. In this instance, the control piston 106 is forward to be positioned near to the front stroke end position. When the braking pressure has been increased to the permissible level $P_{BK}$, the BOTTOMING (c) flag is reset to OFF in step S159, whereby one execution of the subroutine of step S15 is terminated so that the control flow goes to steps S11, S12. In step S11, the reservoir communication valve 132 is switched to its open state. In step S12, the pressure control motor 100 is controlled such that the actual value of the braking pressure is substantially equalized to the value desired by the vehicle operator.

In the present embodiment, as is clear from the above description, the control piston 106 is reciprocated in a case where the piston-bottoming state or the possibility of its occurrence is detected. The reciprocating motion of the control piston 106 increases the amount of the supply of the working fluid to the brake cylinders, thereby permitting the fluid pressure in each of the brake cylinders to be increased. Thus, a large amount of the working fluid can be supplied to the brake cylinders without having to increase the size or capacity of the pressure control cylinder 12.

In the present embodiment, the portions of the ECU 200 assigned to store and execute the piston-bottoming-state detecting routine program constitute a piston-bottoming-state detecting portion. The portions of the ECU 200 assigned to store and implement steps S11–S15 of the braking-pressure control program constitute a piston-displacement control portion. The piston-displacement control portion includes a reverse-displacement-distance determining portion which is constituted by the portions of the ECU 200 assigned to store and implement steps S132, S152. The portions of the ECU 200 assigned to store and implement steps S4, S7 constitute a master-cylinder-cut-off-valve control portion. The annular cup seal 109 constitutes a working-fluid-flow permitting device. The outflow inhibiting valve 58, the pressure sensor 216 cooperate with the portions of the ECU 200 assigned to store and implement S3, S4, S7 constitute a fast filling device. The fast filling device includes a threshold-pressure-value determining portion or a bottoming-information-basis threshold-pressure-value determining portion which is constituted by the portions of the ECU 200 assigned to store and implement steps S53–S56. The fast filling device further includes a valve control portion which is constituted by the portions of the ECU 200 assigned to store and implement steps S4, S7.

In the embodiment described above, the above-described condition (c) includes requirements that the displacement distance is not smaller than the predetermined value $\beta_2$ close to the full stroke distance, and that the braking pressure is smaller than the predetermined value $P_{BK}$, which is held constant. However, this value $P_{BK}$ does not have to be necessarily constant, but may be increased in steps. That is, this value $P_{BK}$ may be increased each time one reciprocating motion of the control piston 106 is completed, for making it possible to sufficiently increase the braking pressure and the braking force even in the event of occurrence of a fade phenomenon. In this case, the occurrence of the fade phenomenon can be detected on the basis of a relationship between the piston position and the deceleration rate, and/or a relationship between and the deceleration rate and the operating force applied to the brake pedal 34. Where the amount of the electric current supplied to the pressure control motor 100 is being still increased while the control piston 106 is reaching almost in the front stroke end position, or where the operating force applied to the brake pedal 34 is being still increased while the control piston 106 is reaching almost in the front stroke end position, it is possible to determine that the braking force has not yet been increased to a level desired by the vehicle driver. In such a case, two or more reciprocation motions of the control piston 106 are effective for increasing the braking force to the desired level.

In the embodiment described above, the braking pressure is not controlled by controlling the pressure control cylinder 12 in the event of a failure of the brake-application sections of the braking system. However, even in such a failure, the braking pressure may be controlled by means of the pressure control cylinder 12. In the thus modified arrangement, the reduction in the braking force due to the failure can be prevented or minimized by the reciprocating motion or motions of the control piston 106.

It should be further noted that the activation of the pressure control motor 100 is not essential for displacing the control piston 106 in the reverse direction. This is because the control piston 106 can be reversed owing to the fluid pressure in the pressure controlling chamber 120 without the activation of the motor 106, and positioned in such a position that equalizes the fluid pressures in the pressure controlling chamber 120 and in the rear pressure chamber 128 to each other. However, since the control piston 106 can not be rapidly reversed by the difference between the fluid pressures in the respective chambers 120, 128, it is preferable to activate the pressure control motor 100 to be rotated in the reverse direction where a rapid reverse displacement of the control piston 106 is required.

Figure 10:
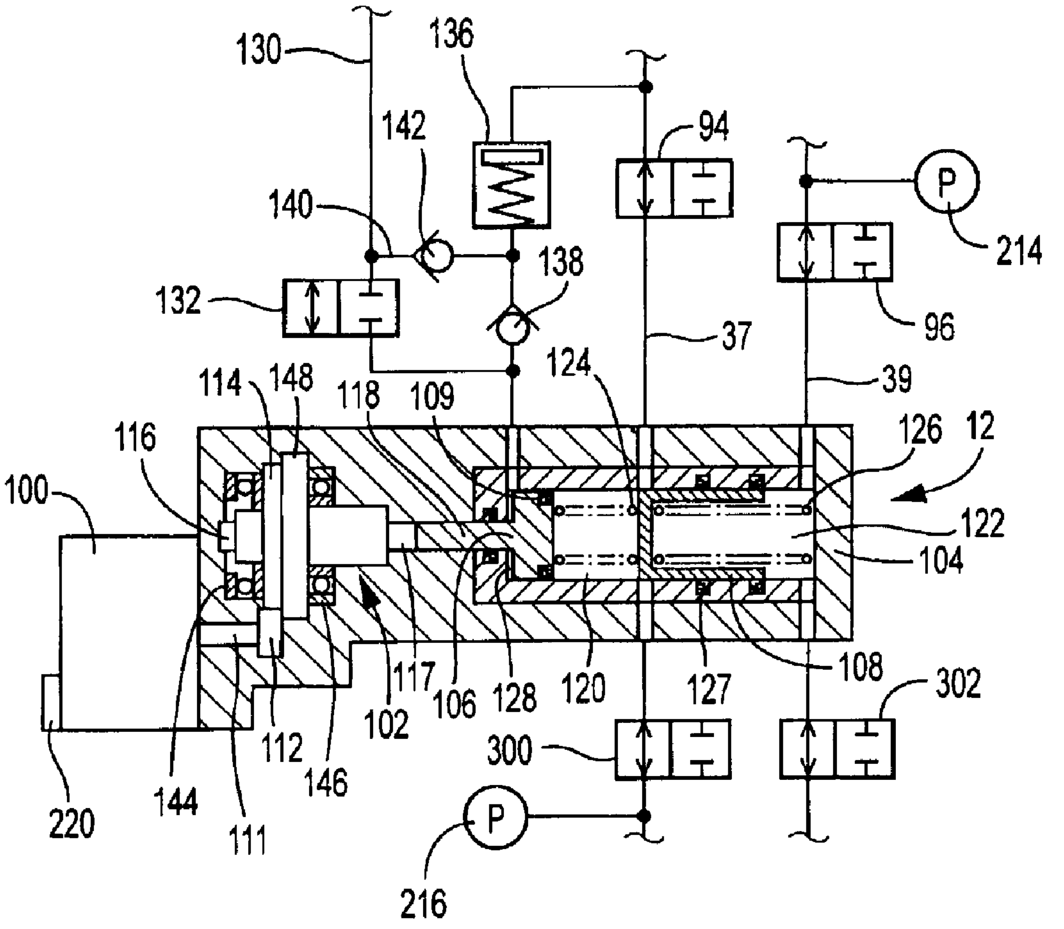
FIG. 10 is a part of a hydraulic circuit diagram of a braking system according to a second embodiment of this invention.
Figure 11:
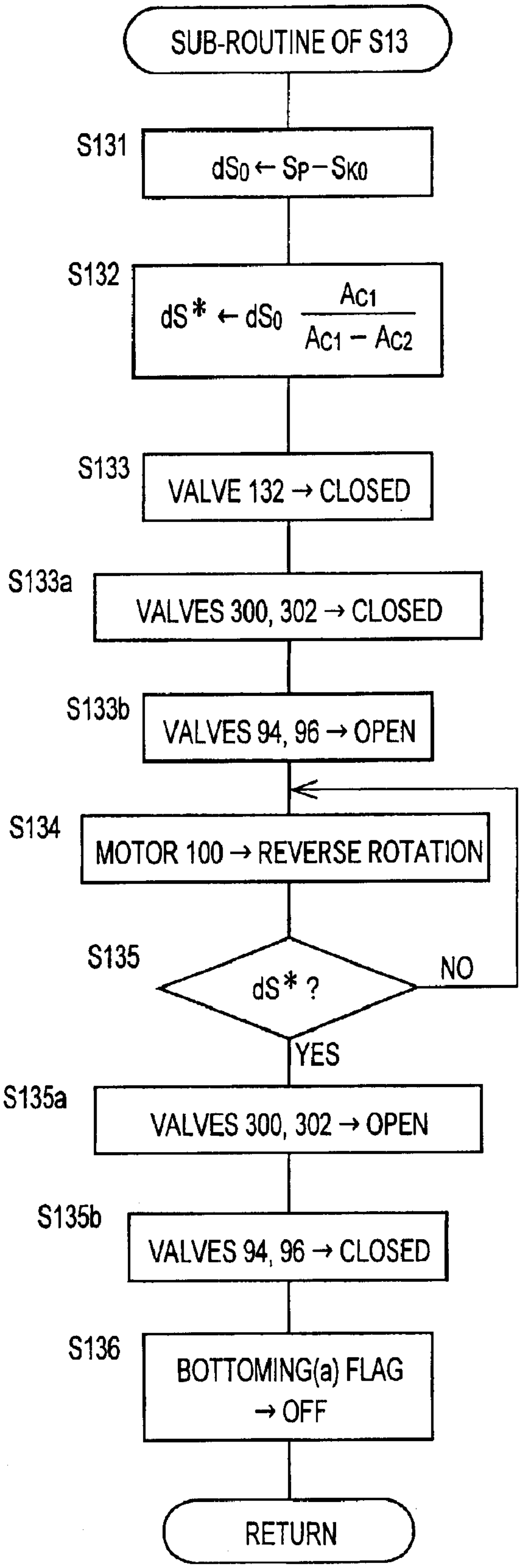
FIG. 11 is a flow chart illustrating a part of a braking-pressure control routine executed according to a control program stored in a ROM of a braking-pressure control device of the braking system of FIG. 10.
Figure 12:
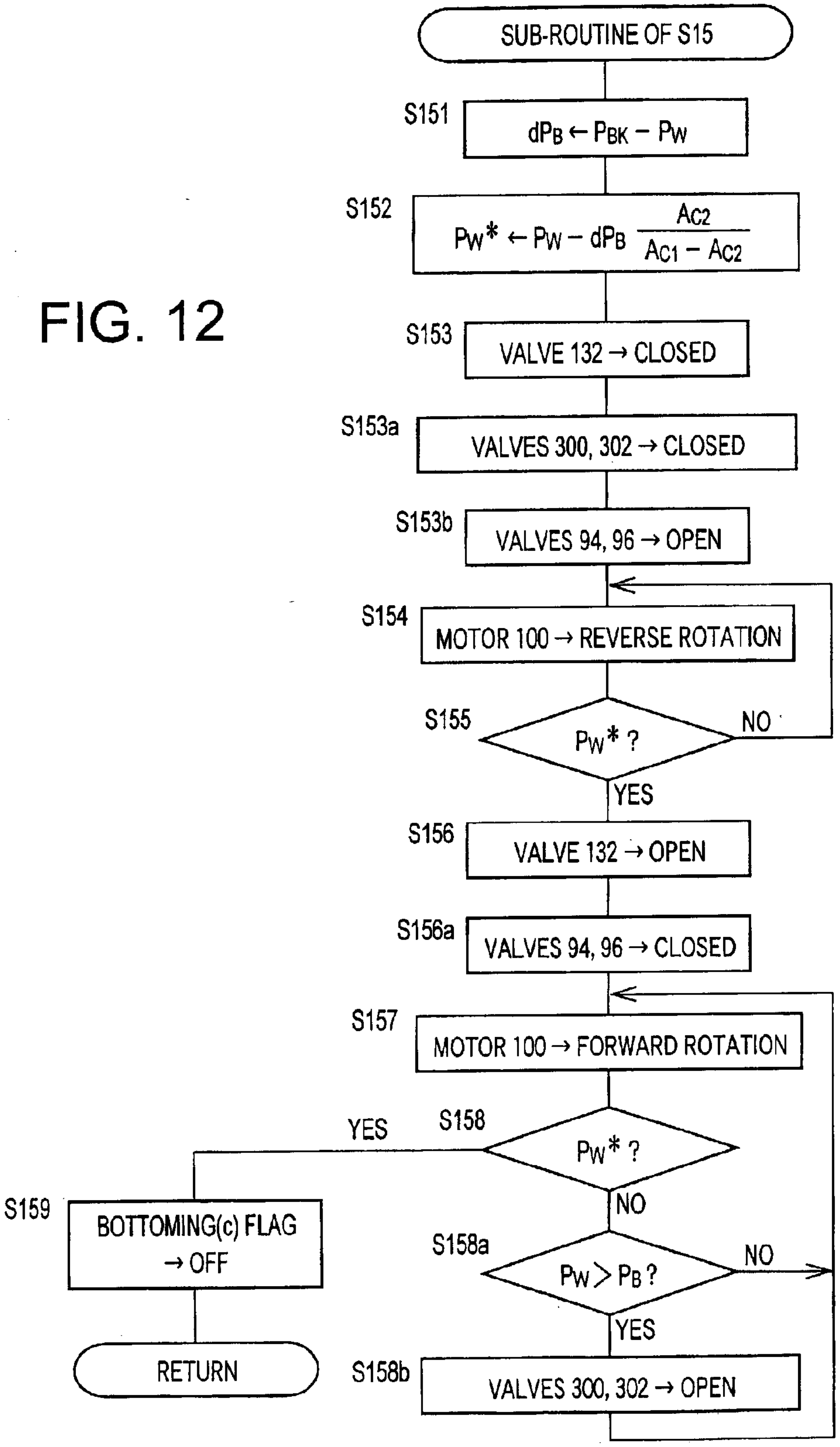
FIG. 12 is a flow chart illustrating a part of the braking-pressure control routine executed according to the control program stored in the ROM of the braking-pressure control device of the braking system of FIG. 10.

Referring to FIGS. 10–12, there will be described a braking system according to a second embodiment of the present invention. In this second embodiment, the fluid passages 37, 39 are provided, at portions thereof downstream of the pressure control cylinder 12, with respective brake-cylinder cut-off valves 300, 302 each consisting of a solenoid operated valve. The brake-cylinder cut-off valve 300 is positioned between the pressure controlling chamber 120 and the individual pressure-control valve devices 166, while the brake-cylinder cut-off valve 302 is positioned between the pressure controlling chamber 122 and the individual pressure-control valve devices 168. In this arrangement, when the control piston 106 is displaced in the reverse direction, the fluid pressure in each of the brake cylinders 18, 20 can be prevented from being reduced, by placing the brake-cylinder cut-off valves 300, 302 in their closed states. When the control piston 106 is displaced in the forward direction, the fluid pressure in each of the brake cylinders 18, 20 can be increased as a result of the forward displacement of the control piston 106, by placing the brake-cylinder cut-off valves 300, 302 in their open states.

In this second embodiment in which the fluid pressure in the pressure controlling chamber 120 is not reduced even during the reverse displacement of the control piston 106, the distance by which the control piston 106 is to be displaced in the reverse direction is determined on the basis of the piston position rather than on the basis of the braking pressure, where the BOTTOMING (c) is detected, as well as where the BOTTOMING (a) or (b) is detected (i.e., as well as where the above-described condition (a) or (b) is satisfied). That is, in the case of the detection of the BOTTOMING (c), the control piston 106 is given a reciprocating motion in which the distance of the reverse displacement is determined on the basis of the position of the control piston 106 upon detection of the BOTTOMING (c). Further, in this second embodiment, it is preferable that the master-cylinder cut-off valves 94, 96 are placed in their open states for permitting the supply of the working fluid from the master cylinder 10 to the pressure controlling chambers 120, 122, so that the fluid pressures in the pressure controlling chambers 120, 122 are prevented from being lowered below the atmospheric level, without supply of the working fluid from the brake cylinders 18, 20 which is inhibited by the closed states of the brake-cylinder cut-off valves 300, 302.

FIG. 11 is a flow chart illustrating a sub-routine of step S13 which is different from the sub-routine of step S13 (illustrated in the flow chart of FIG. 5) in the above-described first embodiment in that steps S133*a*, S133*b* are implemented to close the brake-cylinder cut-off valves 300, 302 and to open master-cylinder cut-off valves 94, 96 prior to the reverse displacement of the control piston 106, and in that steps S135*a*, S135*b* are implemented to open the brake-cylinder cut-off valves 300, 302 and to close master-cylinder cut-off valves 94, 96 after the reverse displacement of the control piston 106. In the present second embodiment, it can be considered that the pressure controlling chamber 120 functions as a pump chamber, so that the annular cup seal 109 constitutes an intake valve (working-fluid-flow permitting device) while the brake-cylinder cut-off valves 300, 302 cooperate to constitute an outlet valve. The portions of the ECU 200 assigned to store and implement steps S133*a*, S135*a* constitute a brake-cylinder-cut-off-valve control portion.

Another pressure sensor may be disposed in the upstream side of the brake-cylinder cut-off valves 300, 302, in addition to or in place of the pressure sensor 216 which is disposed in the downstream side of the brake-cylinder cut-off valves 300, 302, so that the distance by which the control piston 106 is to be displaced in the reverse direction can be determined on the basis of the fluid pressure in the pressure controlling chamber 120 where the BOTTOMING (c) is detected. Further, where the two pressure sensors are disposed on the respective opposite sides of the brake-cylinder cut-off valves 300, 302, it is possible to switch the brake-cylinder cut-off valves 300, 302 from their closed states to their open states. That is, the brake-cylinder cut-off valves 300, 302 can be controlled on the basis of a difference between the fluid pressures which are detected by the two pressure sensors disposed on the respective opposite sides of the brake-cylinder cut-off valves 300, 302. For example, step S158*a* is implemented to compare the braking pressure $P_W$ (detected by one of the two pressure sensors) and the fluid pressure $P_B$ in the pressure controlling chamber 120 (detected by the other pressure sensor). When the braking pressure $P_W$ exceeds the fluid pressure $P_B$ in the pressure controlling chamber 120, an affirmative decision is obtained in step S158*a*, so that step S158*b* is implemented to open the brake-cylinder cut-off valves 300, 302. In this second embodiment, it is possible to reliably prevent an undesirable reduction in the braking pressure. It is noted that the provision of the two pressure sensors on the respective opposite sides of the brake-cylinder cut-off valves 300, 302 is not essential. This is because the fluid pressure $P_B$ in the pressure controlling chamber 120 can be estimated on the basis of the advanced position of the control piston 106. That is, the brake-cylinder cut-off valves 300, 302 can be controlled by comparing the estimated fluid pressure $P_B$ in the pressure controlling chamber 120 with the detected braking pressure $P_W$.

Figure 13:
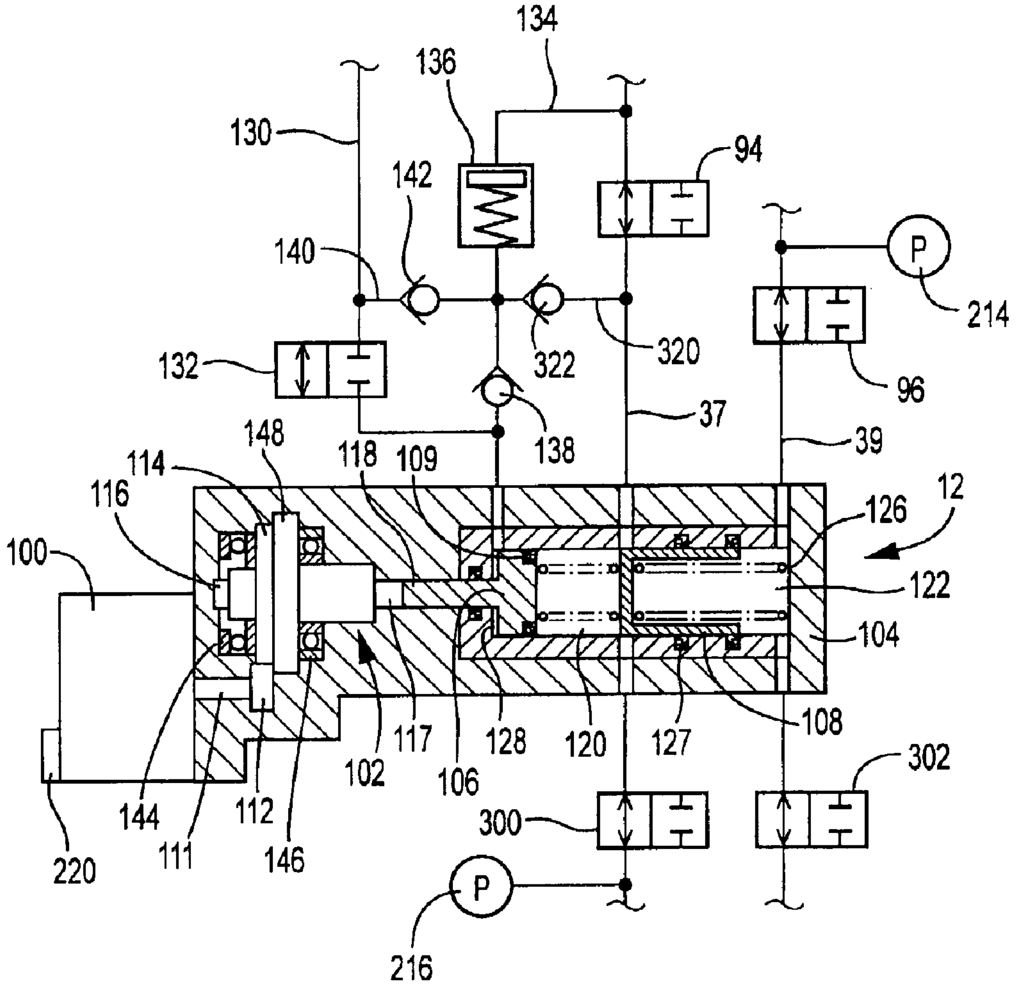
FIG. 13 is a part of a hydraulic circuit diagram of a braking system according to a third embodiment of the invention.

FIG. 13 illustrates a braking system constructed according to a third embodiment of the present invention. In this third embodiment, a fluid passage 320 is provided to connect a portion of the by-pass fluid passage 134 between the stroke simulator 136 and the check valve 138, with a portion of the fluid passage 37 between the master-cylinder cut-off valve 94 and the pressure controlling chamber 120. The fluid passage 320 is provided with a check valve 322 which permits flow of the working fluid in a direction away from the reservoir 54 toward the pressure controlling chamber 120 but inhibits flow of the fluid in the reverse direction. The pressure controlling chamber 120 and the reservoir 54 are connected to each other through the fluid passages 130, 140, 320, 37, with the two check valves 142, 322 being interposed between the pressure controlling chamber 120 and the reservoir 54. In this arrangement, the working fluid is supplied from the reservoir 54 to the pressure controlling chamber 120 via the check valves 142, 322, when the volume of the pressure controlling chamber 120 is increased. The check valves 142, 322 serve to inhibit outflow of the working fluid from the pressure controlling chamber 120 toward the reservoir 54 and the stroke simulator 136. In this third embodiment, the reservoir communication valve 132 and the check valves 142, 322 constitute a working-fluid-flow permitting device, while the brake-cylinder cut-off valves 300, 302 constitute an outlet valve.

Figure 14:
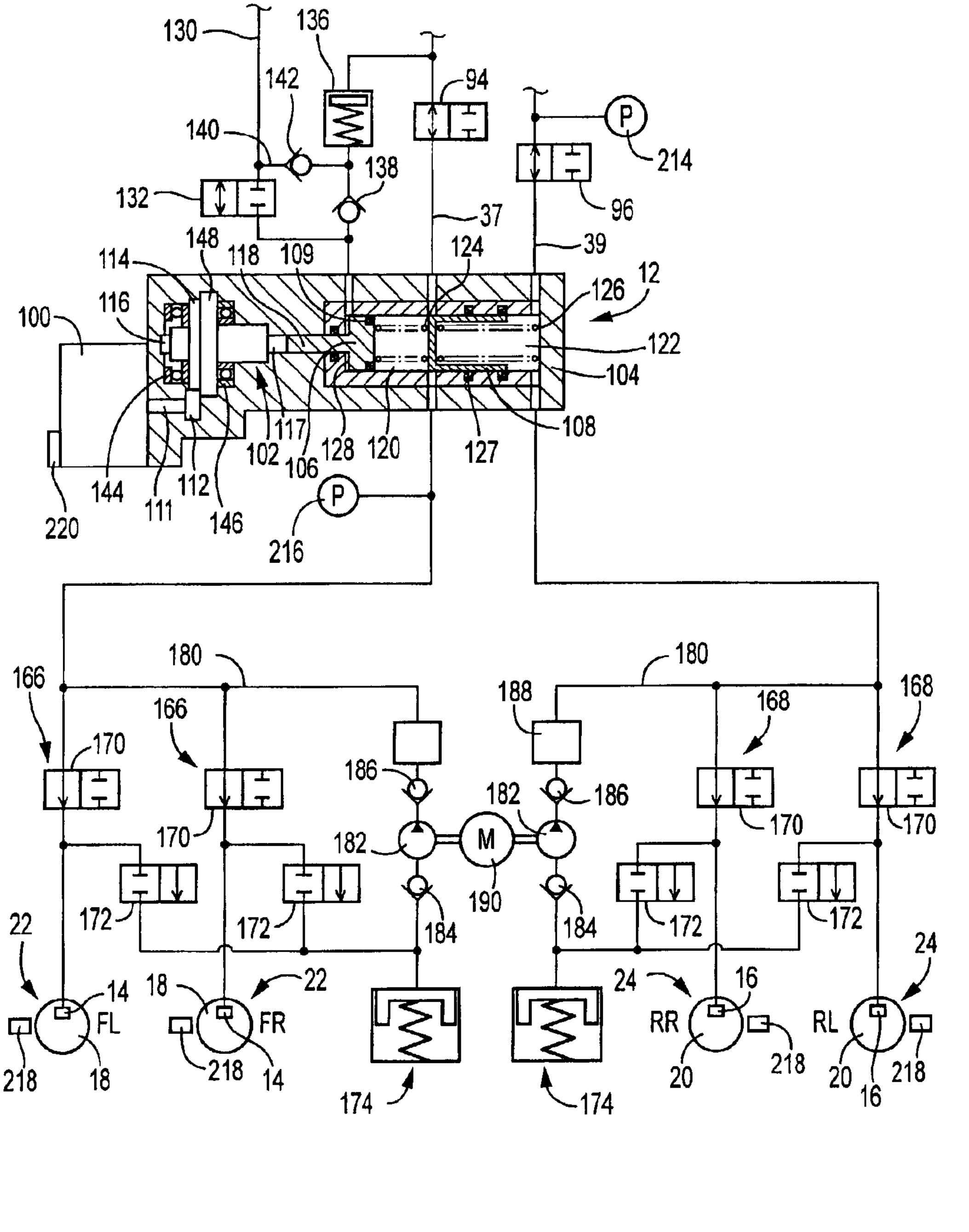
FIG. 14 is a part of a hydraulic circuit diagram of a braking system according to a fourth embodiment of the invention.

FIG. 14 illustrates a braking system constructed according to a fourth embodiment of the present invention. In this fourth embodiment in which the brake-cylinder cut-off valves 300, 302 are not provided, the pressure increasing valves 170 are used for isolating the pressure controlling chamber 120 from the brake cylinders 14, 16. To this end, the by-pass fluid passages, which by-pass the respective pressure increasing valves 170 and which are provided with the respective check valves 173 in the above-described first, second and third embodiments, are not provided in this embodiment. When the control piston 106 is displaced in the reverse direction, the pressure increasing valves 170 are placed in their closed states for avoiding reduction in the fluid pressures in the brake cylinders 14, 16.

Figure 15:
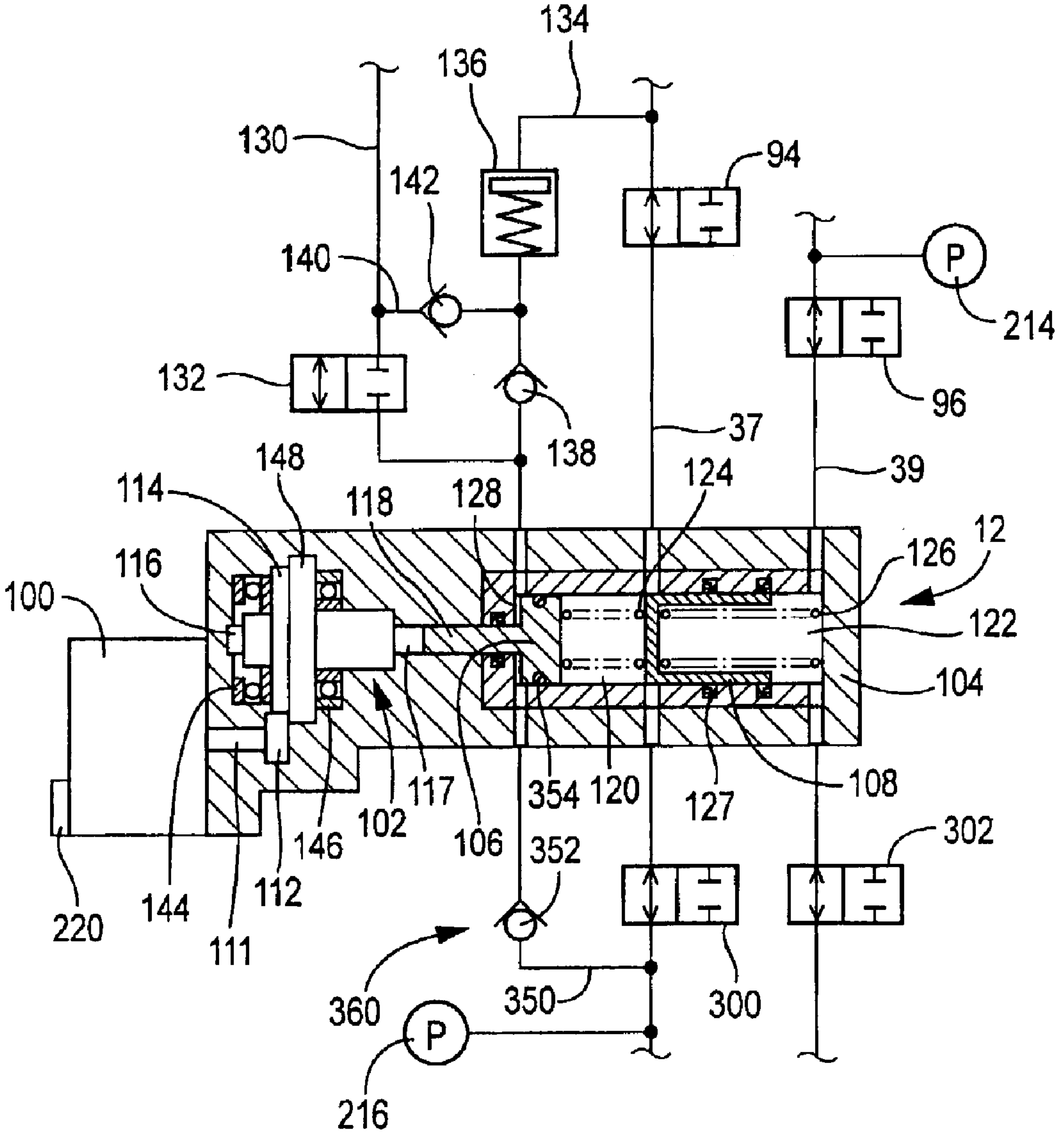
FIG. 15 is a part of a hydraulic circuit diagram of a braking system according to a fifth embodiment of the invention.

FIG. 15 illustrates a braking system constructed according to a fifth embodiment of the invention. In this fifth embodiment, a fluid passage 350 is provided to connect the rear pressure chamber 128 with a portion of the fluid passage 37 which portion is located on the downstream side of the brake-cylinder cut-off valve 300. The fluid passage 350 is provided with a check valve 352 which permits flow of the working fluid in a direction away from the rear pressure chamber 128 toward the fluid passage 37 but inhibits flow of the fluid in the reverse direction. An O-ring 354, in place of the annular cup seal 109, is mounted on the outer circumferential surface of the control piston 106, to maintain fluid tightness between the control piston 106 and the housing 104. The O-ring 354 serves to isolate the pressure controlling chamber 120 and the rear pressure chamber 128 from each other, and inhibits flow of the working fluid between the two chambers 120, 128. When the control piston 106 is displaced in the reverse direction, the master-cylinder cut-off valves 94, 96 are placed in their open states for permitting the working fluid to be supplied from the master cylinder 10 to the pressure controlling chamber 120. The fluid passage 350 and the check valve 350 constitute a working-fluid-supply permitting device 360.

In the braking system constructed as described above, the working fluid is supplied from the rear pressure chamber 128 directly to the front-wheel brake cylinders 14 without its passage through the brake-cylinder cut-off valves 300, 302, when the fluid pressure in the rear pressure chamber 128 exceeds the fluid pressures in each of the brake cylinders 14 as a result of the increase in the fluid pressure in the rear pressure chamber 128 owing to the reverse displacement of the control piston 106. That is, the braking pressure can be increased also during the reverse displacement of the control piston 106.

Since a rear pressure-receiving surface of the control piston 106 partially defining the rear pressure chamber 128 is smaller than a front pressure-receiving surface of the control piston 106 partially defining the pressure controlling chamber 120, a required amount of the displacement of the control piston 106 for supplying a certain amount of the working fluid to the brake cylinders 14, 16 is larger where the supply of the working fluid is made by the reverse displacement of the control piston 106, than where the supply of the working fluid is made by the forward displacement of the control piston 106. However, a driving force required for the reverse displacement of the control piston 106 is smaller than that required for the forward displacement of the control piston 106. This means that it is not possible to supply the working fluid to the brake cylinders 14, 16 at a higher rate by the reverse displacement of the control piston 106 than by the forward displacement of the control piston 106, but it is possible to increase the fluid pressure in each of the brake cylinders 14, 16 to a higher level by the reverse displacement of the control piston 106 than by the forward displacement of the control piston 106. That is, even where the pressure control motor 100 as the driving source does not have a large capacity, the fluid pressure in each of the brake cylinders 14, 16 can be increased to a sufficiently high level by the reverse displacement of the control piston 106. In general, it is not necessary to supply a large amount of the working fluid to each of the brake cylinders 14, 16 at a high rate, where the fluid pressure has reached almost a required high level.

It is noted that the working-fluid-supply permitting device 360 can be constituted by an electromagnetically operated valve in place of the check valve 352. In this case, the electromagnetically operated valve is controlled to be placed in its closed state when the control piston 106 is advanced and to be placed in its open state when the control piston 106 is reversed.

Figure 16:
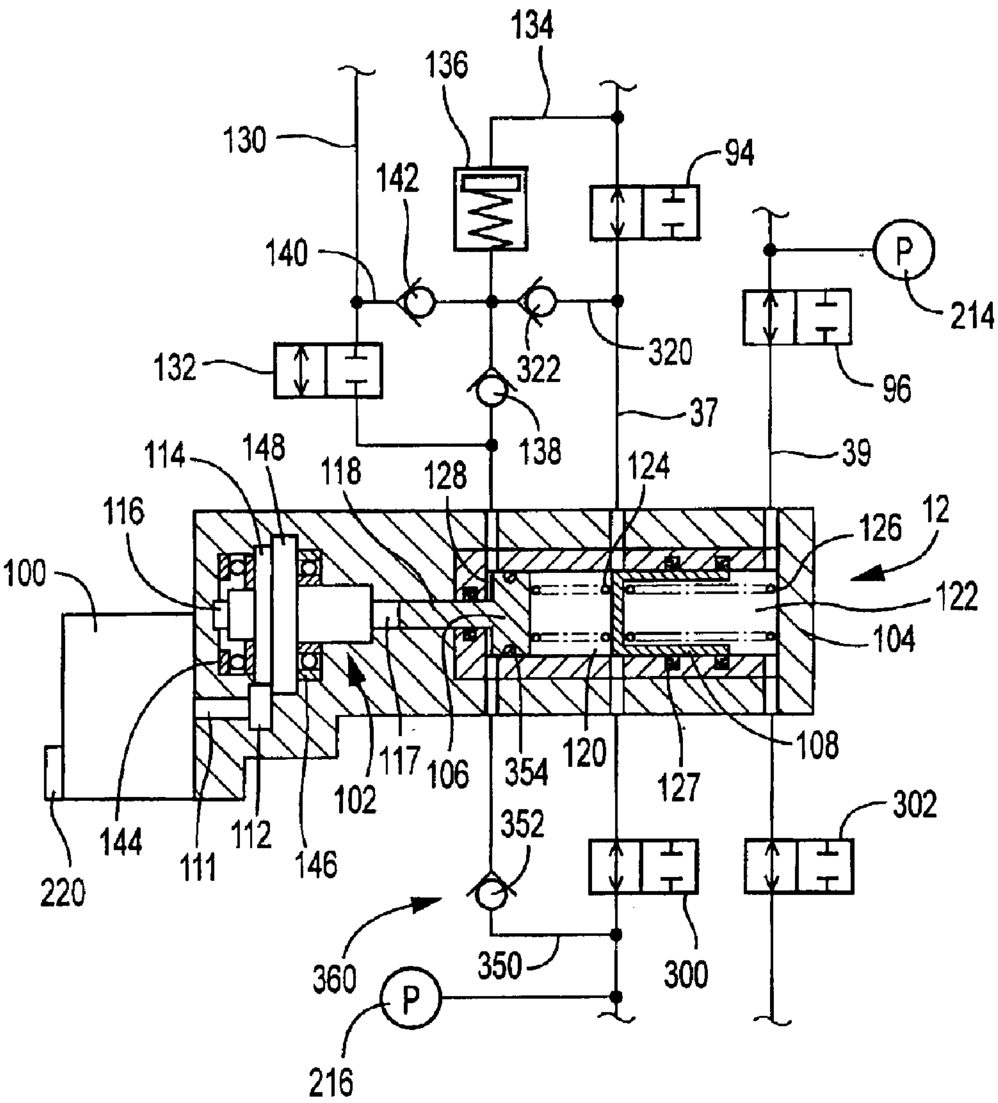
FIG. 16 is a part of a hydraulic circuit diagram of a braking system according to a sixth embodiment of the invention.

FIG. 16 illustrates a braking system constructed according to a sixth embodiment of the invention in which the arrangements of the above-described third and fifth embodiments illustrated in FIGS. 13 and 15 are combined.

Figure 17:
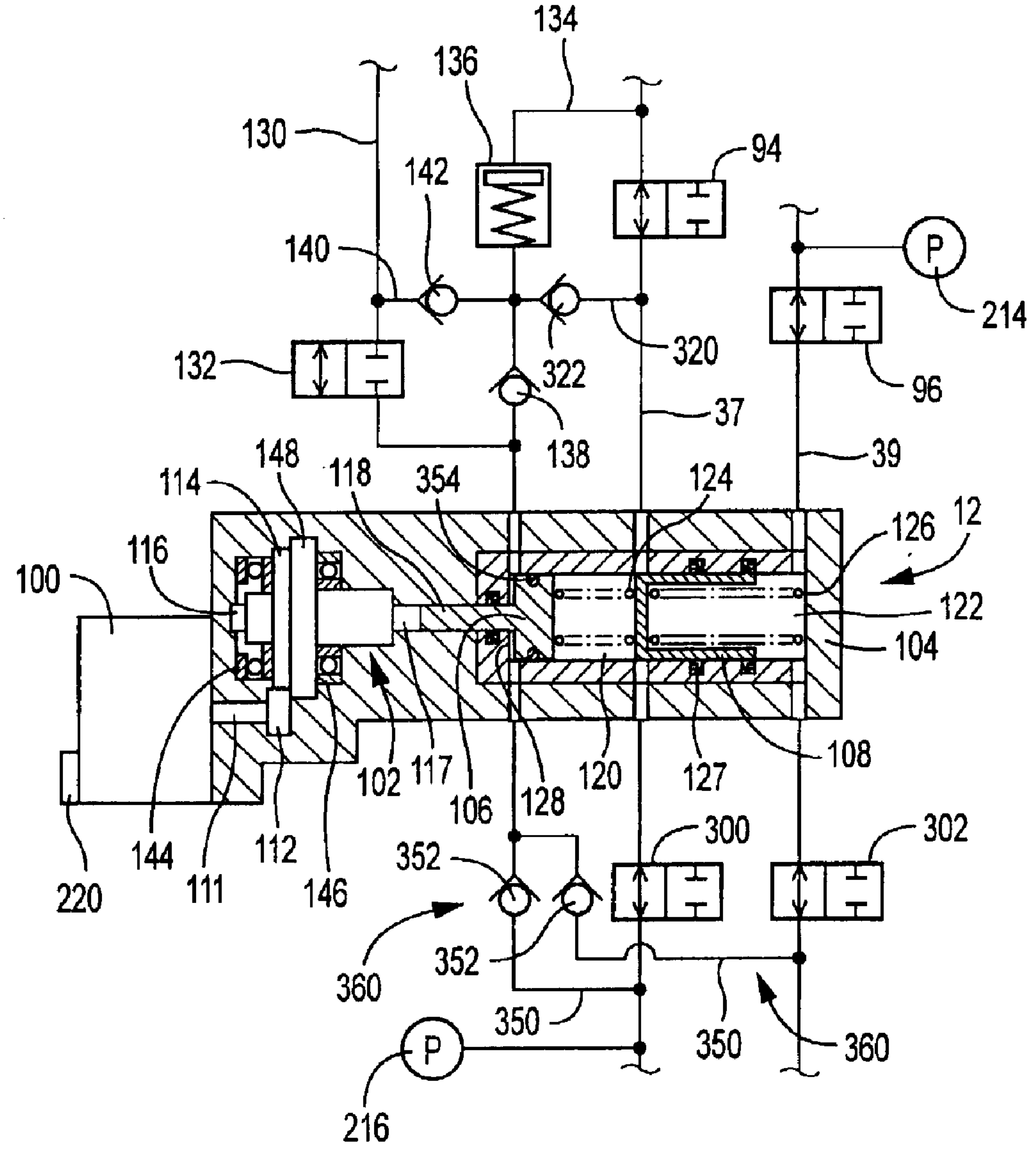
FIG. 17 is a part of a hydraulic circuit diagram of a braking system according to a seventh embodiment of the invention.

FIG. 17 illustrates a braking system constructed according to a seventh embodiment of the invention in which the working-fluid-supply permitting device 360 is disposed not only between the rear pressure chamber 128 and the fluid passage 37 but also between the rear pressure chamber 128 and the fluid passage 39. This arrangement makes it possible to supply the working fluid directly from the rear pressure chamber 128 not only to the front-wheel brake cylinders 14 but also to the rear-wheel brake cylinders 16.

Figure 18:
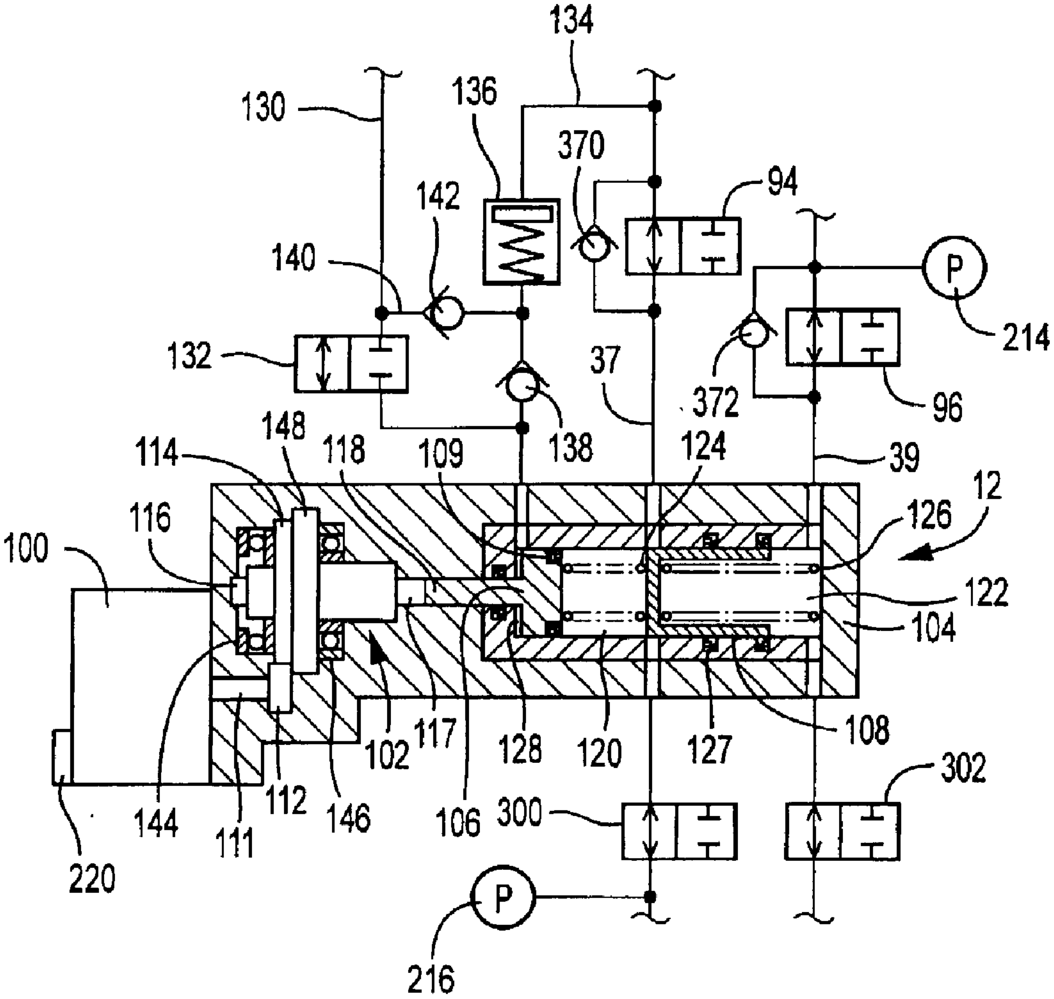
FIG. 18 is a part of a hydraulic circuit diagram of a braking system according to an eighth embodiment of the invention.

FIG. 18 illustrates a braking system constructed according to an eighth embodiment of the invention in which by-pass passages are provided to by-pass the respective master-cylinder cut-off valves 94, 96. The by-pass passages are provided with respective check valves 370, 372, so that the check valves 370, 372 are disposed in parallel connection with the respective master-cylinder cut-off valves 94, 96. The check valves 370, 372 permit flows of the working fluid in a direction away from the master cylinder 10 toward the pressure controlling chambers 120, 122, but inhibit flows of the working fluid in the reverse direction. This arrangement permits the working fluid to be supplied from the master cylinder 10 to the pressure controlling chambers 120, 122 through the check valves 370, 372, even without having to switch the master-cylinder cut-off valves 94, 96 to their open state during the reverse displacement of the control piston 106. Further, this arrangement makes it possible to supply the working fluid from the master cylinder 10 to the pressure controlling chambers 120, 122 through the check valves 370, 372 as long as the fluid pressure in the master cylinder 10 is higher than that in each of the pressure controlling chambers 120, 122, during also the normal control of the braking pressure.

While each of the outflow inhibiting valve 58, reservoir communication valve 132, master-cylinder cut-off valves 94, 96 and brake-cylinder cut-off valves 300, 302 consists of a solenoid operated valve which is opened and closed by energization and de-energization of its coil in the above-described embodiments, at least one of these valves may consist of a linear control valve the opening of which is variable with an amount of electric current applied to its coil so that a difference between pressures on opposite sides of the valve can be controlled to be proportional to the amount of the electric current.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system comprising:

a hydraulically operated brake cylinder capable of operating a brake;

a pressure control cylinder having a housing, a piston which is received in said housing and which is displaceable relative to said housing between front and rear stroke end positions by activation of a drive source, and a pressure controlling chamber which is located on a front side of said piston and which is connected to said brake cylinder, so that a working fluid can be supplied from said pressure controlling chamber to said brake cylinder, by displacement of said piston in a direction away from the rear stroke end position toward the front stroke end position; and a braking-pressure control device operable to control the activation of said drive source, for controlling a pressure of the working fluid in said pressure controlling chamber, so that a pressure of the working fluid in said brake cylinder can be controlled, wherein said braking-pressure control device includes:

a piston-bottoming-state detecting portion operable to detect at least one of a piston-bottoming state in which said piston has reached almost in the front stroke end position while the pressure of the working fluid in said brake cylinder has not yet reached a predetermined level, and a possibility of occurrence of said piston-bottoming state; and a drive-source control portion operable to control the activation of said drive source on the basis of result of detection made by said piston-bottoming-state detecting portion.

2. A braking system according to claim 1, wherein said drive-source control portion of said braking-pressure control device includes a piston-displacement control portion operable to displace said piston in a reverse direction that is opposite to said direction as a forward direction and to displace said piston in said forward direction, when at least one of said piston-bottoming state and said possibility of occurrence of said piston-bottoming state is detected by said piston-bottoming-state detecting portion, said braking system further comprising a working-fluid-flow permitting device capable of permitting flow of said working fluid to said pressure controlling chamber from a portion of said braking system other than said brake cylinder, when said piston is displaced in said reverse direction.

3. A braking system according to claim 2, wherein said piston-displacement control portion includes a reversedisplacement-distance determining portion operable to determine a distance by which said piston is to be displaced in said reverse direction, on the basis of a relationship between the pressure of the working fluid in said pressure controlling chamber and a distance from the rear stroke end position to a position of said piston.

4. A braking system according to claim 2, wherein said piston-displacement control portion includes a reverse-displacement-distance determining portion operable to determine a distance by which said piston is to be displaced in said reverse direction, on the basis of at least one of the pressure of the working fluid in said pressure controlling chamber upon detection of said piston-bottoming state or said possibility of occurrence by said piston-bottoming-state detecting portion, and a distance from the rear stroke end position to a position of said piston upon detection of said piston-bottoming state or said possibility of occurrence by said piston-bottoming-state detecting portion.

5. A braking system according to claim 2, wherein said piston-displacement control portion includes a reciprocation-number determining portion operable to determine a required number of times of reciprocations of said piston, on the basis of at least one of the pressure of the working fluid in said pressure controlling chamber, and a distance from the rear stroke end position to a position of said piston.

6. A braking system according to claim 2, further comprising a brake-cylinder cut-off valve disposed between said pressure controlling chamber and said brake cylinder, and having an open state in which said pressure controlling chamber and said brake cylinder are communicated with each other, and a closed state in which said pressure controlling chamber and said brake cylinder are isolated from each other, wherein said braking-pressure control device includes a brake-cylinder-cut-off-valve control portion operable to place said brake-cylinder cut-off valve in said closed state when said piston of said pressure control cylinder is displaced in said reverse direction.

7. A braking system according to claim 6, wherein said hydraulically operated brake cylinder consists of a plurality of brake cylinders, said braking system further comprising:

a low-pressure source which stores the working fluid under a pressure substantially equal to an atmospheric pressure;

a plurality of individual pressure-control valve devices each including a pressure increasing valve and a pressure reducing valve, said pressure increasing valve being disposed between a corresponding one of said plurality of brake cylinders and said pressure controlling chamber, said pressure reducing valve being disposed between the corresponding one of said plurality of brake cylinders and said low-pressure source;

wherein said braking-pressure control device further includes an anti-lock braking control portion operable to control the pressure of the working fluid in each of said plurality of brake cylinders such that a degree of wheel slipping is held within a predetermined range, by controlling at least one of said pressure increasing valve and said pressure reducing valve;

and wherein said brake-cylinder cut-off valve is provided by said pressure increasing valve.

8. A braking system according to claim 2, further comprising a working fluid source, wherein said working-fluid-flow permitting device includes an inlet valve which is disposed between said working fluid source and said pressure controlling chamber and which is capable of permitting flow of said working fluid from said working fluid source toward said pressure controlling chamber when said piston is displaced in said reverse direction.

9. A braking system according to claim 2, further comprising:

a master cylinder operable according to an operation of a brake operating member, to pressurize the working fluid; and a master-cylinder cut-off valve disposed between said pressure controlling chamber and said master cylinder, and having an open state in which said pressure controlling chamber and said master cylinder are communicated with each other, and a closed state in which said pressure controlling chamber and said master cylinder are isolated from each other, wherein said braking-pressure control device includes a master-cylinder-cut-off-valve control portion operable to place said master-cylinder cut-off valve in said open state when said piston is displaced in said reverse direction, and wherein said working-fluid-flow permitting device is provided by said master-cylinder cut-off valve.

10. A braking system according to claim 6, wherein said pressure control cylinder further has a rear pressure chamber which is located on a rear side of said piston, said braking system further comprising:

a working-fluid-supply permitting device which is capable of permitting supply of the working fluid from said rear pressure chamber toward said brake cylinder without passage of the working fluid through said brake-cylinder cut-off valve when said piston is displaced in said reverse direction; and a working-fluid-flow inhibiting device which is capable of inhibiting flow of the working fluid from said rear pressure chamber toward a portion of said braking system other than said brake cylinder when said piston is displaced in said reverse direction.

11. A braking system according to claim 10, wherein said working-fluid-flow inhibiting device includes a flow permitting portion which is capable of permitting flow of the working fluid toward said rear pressure chamber when said piston is displaced in said forward direction.

12. A braking system according to claim 10, wherein said working-fluid-supply permitting device includes a check valve which is capable of permitting flow of the working fluid from said rear pressure chamber toward said brake cylinder and inhibiting flow of the working fluid from said brake cylinder toward said rear pressure chamber.

13. A braking system according to claim 10, wherein said piston of said pressure control cylinder has a rear pressure-receiving surface partially defining said rear pressure chamber and a front pressure-receiving surface partially defining said pressure controlling chamber, and wherein said rear pressure-receiving surface has an area that is smaller than an area of said front pressure-receiving surface.

14. A braking system according to claim 2, wherein said pressure control cylinder further has a rear pressure chamber which is located on a rear side of said piston, said braking system further comprising:

a working fluid source; and an inlet valve which is disposed between said working fluid source and said rear pressure chamber, and which is capable of permitting flow of the working fluid from said working fluid source toward said rear pressure chamber and inhibiting flow of the working fluid from said rear pressure chamber toward said working fluid source.

15. A braking system according to claim 14, further comprising an outlet valve which is disposed between said rear pressure chamber and said pressure controlling chamber, and which is capable of permitting flow of the working fluid from said rear pressure chamber toward said pressure controlling chamber and inhibiting flow of the working fluid from said pressure controlling chamber toward said rear pressure chamber, wherein said working-fluid-flow permitting device is provided by said outlet valve.

16. A braking system comprising:

a hydraulically operated brake cylinder capable of operating a brake;

a pressure control cylinder having a housing, a piston which is received in said housing and which is displaceable relative to said housing between front and rear stroke end positions by activation of a drive source, and a pressure controlling chamber which is located on a front side of said piston and which is connected to said brake cylinder, so that a working fluid can be supplied from said pressure controlling chamber to said brake cylinder, by displacement of said piston in a direction away from the rear stroke end position toward the front stroke end position;

a braking-pressure control device operable to control the activation of said drive source, for controlling a pressure of the working fluid in said pressure controlling chamber, so that a pressure of the working fluid in said brake cylinder can be controlled; and a master cylinder having a master-cylinder housing, and a master-cylinder piston which is displaceably received in said master-cylinder housing and which is connected to a brake operating member, said master cylinder being connected to said brake cylinder so that the working fluid can be supplied from said master cylinder to said brake cylinder, by forward displacement of said master-cylinder piston relative to said master-cylinder housing in response to an operation of said brake operating member;

wherein said braking-pressure control device includes a fast-filling control portion operable to control amount of flow of the working fluid from said master cylinder toward said brake cylinder such that a ratio of said amount of flow of the working fluid to an amount of the forward displacement of said master-cylinder piston is made larger when said pressure of the working fluid in said brake cylinder is not larger than a predetermined threshold value, than when said pressure of the working fluid in said brake cylinder is larger than said predetermined threshold value, and wherein said braking-pressure control device controls the activation of said drive source for thereby controlling said pressure of the working fluid in said pressure controlling chamber, while said brake cylinder is isolated from said master cylinder.

17. A braking system according to claim 16, further comprising a master-cylinder cut-off valve which is disposed between said pressure controlling chamber and said master cylinder, said master-cylinder cut-off valve having an open state in which said pressure controlling chamber and said master cylinder are communicated with each other, and a closed state in which said pressure controlling chamber and said master cylinder are isolated from each other, wherein said fast-filling control portion of said braking-pressure control device switches said master-cylinder cut-off valve from said open state to said closed state when said pressure of the working fluid is increased to said predetermined threshold value.

18. A braking system according to claim 16, wherein said master-cylinder piston of said master cylinder includes a large-diameter portion and a small-diameter portion, and cooperates with said master-cylinder housing to define first and second pressurizing chambers, such that the working fluid can be supplied from said first and second pressurizing chambers to said brake cylinder, by the forward displacement of said master-cylinder piston relative to said master-cylinder housing, said braking system further comprising:

a working fluid source; and an outflow inhibiting valve which is disposed between said working fluid source and said first pressurizing chamber, and which is controlled by said fast-filling control portion of said braking-pressure control device, such that said outflow inhibiting valve inhibits flow of the working fluid from said first pressurizing chamber toward said working fluid source when said pressure of the working fluid in said brake cylinder is not larger than said predetermined threshold value, and such that said outflow inhibiting valve permits said flow of the working fluid from said first pressurizing chamber toward said working fluid source when said pressure of the working fluid in said brake cylinder is larger than said predetermined threshold value.

19. A braking system according to claim 18, further comprising a master-cylinder cut-off valve which is disposed between said pressure controlling chamber and said master cylinder, said master-cylinder cut-off valve having an open state in which said pressure controlling chamber and said master cylinder are communicated with each other, and a closed state in which said pressure controlling chamber and said master cylinder are isolated from each other, wherein said braking-pressure control device includes a valve control portion operable to place said master-cylinder cut-off valve in said closed state and to place said outflow inhibiting device in a flow-permitting state for permitting said flow of the working fluid from said first pressurizing chamber toward said working fluid source, when said pressure of the working fluid in said brake cylinder is larger than said predetermined threshold value.

20. A braking system according to claim 16, wherein said fast-filling control portion of said braking-pressure control device includes:

a piston-bottoming-state detecting portion operable to detect at least one of a piston-bottoming state in which said piston of said pressure control cylinder has reached almost in the front stroke end position while the pressure of the working fluid in said brake cylinder has not yet reached a predetermined level, and a possibility of occurrence of said piston-bottoming state; and a pressure-threshold-value determining portion operable to determine said threshold value such that said threshold value is larger when said at least one of said piston-bottoming state and said possibility of occurrence of said piston-bottoming state is detected, than when neither said piston-bottoming state nor said possibility of occurrence of said piston-bottoming state is detected.

21. A braking system according to claim 20, wherein said pressure-threshold-value determining portion includes a bottoming-information-basis determining portion operable to determine said threshold value on the basis of at least one of said pressure of the working fluid in said pressure controlling chamber upon detection of said piston-bottoming state or said possibility of occurrence by said piston-bottoming-state detecting portion, and a distance from the rear stroke end position to a position of said piston upon detection of said piston-bottoming state or said possibility of occurrence by said piston-bottoming-state detecting portion.

22. A braking system according to claim 16, further comprising a stroke simulator which is allowed to be operable when said brake cylinder is isolated from said master cylinder.

23. A braking system comprising:

a hydraulically operated brake cylinder capable of operating a brake;

a pressure control cylinder having a housing, a piston which is received in said housing and which is displaceable relative to said housing between front and rear stroke end positions by activation of a drive source, and a pressure controlling chamber which is located on a front side of said piston and which is connected to said brake cylinder, so that a working fluid can be supplied from said pressure controlling chamber to said brake cylinder, by displacement of said piston in a direction away from the rear stroke end position toward the front stroke end position;

a braking-pressure control device operable to control the activation of said drive source, for controlling a pressure of the working fluid in said pressure controlling chamber, so that a pressure of the working fluid in said brake cylinder can be controlled;

a master cylinder operable according to an operation of a brake operating member, to pressurize the working fluid; and a master-cylinder cut-off valve disposed between said pressure controlling chamber and said master cylinder, and having an open state in which said pressure controlling chamber and said master cylinder are communicated with each other, and a closed state in which said pressure controlling chamber and said master cylinder are isolated from each other, wherein said braking-pressure control device includes:

a working-fluid-deficiency detecting portion which is operable to detect at least one of a deficiency of the working fluid within said pressure controlling chamber and a possibility of occurrence of said deficiency, while the pressure of the working fluid in said brake cylinder is controlled by said pressure control cylinder, with said master-cylinder cut-off valve being held in said closed state; and a piston-displacement control portion operable to displace said piston in a reverse direction that is opposite to said direction as a forward direction and to displace said piston in said forward direction, when at least one of said deficiency of the working fluid and said possibility of occurrence of said deficiency is detected by said working-fluid-deficiency detecting portion.

24. A braking system comprising:

a hydraulically operated brake cylinder capable of operating a brake;

a pressure control cylinder having a housing, a piston which is received in said housing and which is displaceable relative to said housing between front and rear stroke end positions by activation of a drive source, and a pressure controlling chamber which is located on a front side of said piston and which is connected to said brake cylinder, so that a working fluid can be supplied from said pressure controlling chamber to said brake cylinder, by displacement of said piston in a direction away from the rear stroke end position toward the front stroke end position;

a braking-pressure control device operable to control the activation of said drive source, for controlling a pressure of the working fluid in said pressure controlling chamber, so that a pressure of the working fluid in said brake cylinder can be controlled;

a master cylinder operable according to an operation of a brake operating member, to pressurize the working fluid; and a master-cylinder cut-off valve disposed between said pressure controlling chamber and said master cylinder, and having an open state in which said pressure controlling chamber and said master cylinder are communicated with each other, and a closed state in which said pressure controlling chamber and said master cylinder are isolated from each other, wherein said braking-pressure control device includes:

a master-cylinder-cut-off-valve control portion operable to switch said master-cylinder cut-off valve from said open state to said closed state when said pressure of the working fluid in said brake cylinder is increased to a predetermined threshold value;

a piston-bottoming-state detecting portion operable to detect at least one of a piston-bottoming state in which said piston of said pressure control cylinder has reached almost in the front stroke end position while the pressure of the working fluid in said brake cylinder has not yet reached a predetermined level, and a possibility of occurrence of said piston-bottoming state; and a pressure-threshold-value determining portion operable to determine said threshold value such that said threshold value is larger when said at least one of said piston-bottoming state and said possibility of occurrence of said piston-bottoming state is detected, than when neither said piston-bottoming state nor said possibility of occurrence of said piston-bottoming state is detected.

* * * * *